(12) United States Patent
Tausch et al.

(10) Patent No.: US 8,336,853 B2
(45) Date of Patent: Dec. 25, 2012

(54) RECOCK HANDLE ASSEMBLIES FOR COUPLER DEVICES AND COUPLER DEVICES COMPRISING THE SAME

(75) Inventors: Mark J. Tausch, West Chester, OH (US); Jeffrey W. Reichert, Liberty Township, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 298 days.

(21) Appl. No.: 12/838,122

(22) Filed: Jul. 16, 2010

(65) Prior Publication Data

US 2011/0011475 A1    Jan. 20, 2011

Related U.S. Application Data

(60) Provisional application No. 61/226,638, filed on Jul. 17, 2009.

(51) Int. Cl.
| | |
|---|---|
| F16L 37/28 | (2006.01) |
| F16L 37/00 | (2006.01) |
| F16L 55/00 | (2006.01) |
| F16K 31/44 | (2006.01) |
| F16K 51/00 | (2006.01) |
| F16K 31/00 | (2006.01) |
| E03B 1/00 | (2006.01) |

(52) U.S. Cl. ............... 251/142; 251/149.9; 251/231; 251/236; 251/144; 251/292; 137/614.06; 285/148.2; 285/148.22; 285/148.26

(58) Field of Classification Search ............ 251/242, 251/144, 231, 232, 233, 234, 235, 236, 291, 251/237, 238, 239, 240, 241, 243; 285/148.2, 285/148.22, 148.26, 316, 317, 320; 137/614.06; 16/411, 900

See application file for complete search history.

(56) References Cited

U.S. PATENT DOCUMENTS

| | | | | |
|---|---|---|---|---|
| 925,483 | A | * | 6/1909 | Kantz .................. 285/148.2 |
| 1,802,510 | A | * | 4/1931 | Hole et al. ............... 251/340 |
| 2,070,013 | A | | 2/1937 | Krannak |
| 2,461,074 | A | * | 2/1949 | Mozingo ................. 285/317 |
| 3,134,613 | A | | 5/1964 | Regan |
| 3,301,272 | A | * | 1/1967 | Pettyjohn et al. ..... 137/614.06 |

(Continued)

OTHER PUBLICATIONS

"1004D4 API Bottom Loading Coupler", OPW Engineered Systems, H32096PA, Jun. 2010, Lebanon, Ohio.

(Continued)

Primary Examiner — John K Fristoe, Jr.
Assistant Examiner — Daphne M Barry
(74) Attorney, Agent, or Firm — Dinsmore & Shohl LLP

(57) ABSTRACT

Recock handle assemblies for bottom loading couplers and bottom loading couplers comprising the same are disclosed. The recock handle assemblies for bottom loading couplers may include a lever portion comprising a first lever arm, a second lever arm and a lever bar oriented in a substantially u-shaped configuration. A handle portion may be joined to the lever portion with a first pivot block and a second pivot block, the handle portion comprising a first connecting leg, a second connecting leg, and a bail. The first connecting leg and the second connecting leg may be positioned in a first plane and the bail is non-coplanar with the first plane. A first base plate may be pivotally coupled to the first pivot block. The first base plate may include a first body guide member and a first sleeve guide member. A second base plate may be pivotally coupled to the second pivot block, the second base plate comprising a second body guide member and a second sleeve guide member.

13 Claims, 12 Drawing Sheets

U.S. PATENT DOCUMENTS

| | | | |
|---|---|---|---|
| 3,503,637 A | | 3/1970 | Maeshiba Sosaburo |
| 3,664,375 A | * | 5/1972 | Marette .................... 137/614.04 |
| 3,884,448 A | * | 5/1975 | Millar et al. ............... 251/149.9 |
| 3,897,091 A | * | 7/1975 | McMath et al. .............. 285/311 |
| 4,030,524 A | * | 6/1977 | McMath et al. ......... 137/614.06 |
| 4,359,066 A | * | 11/1982 | Hunt ........................ 137/614.06 |
| 4,515,182 A | | 5/1985 | Le Devehat |
| 4,681,350 A | | 7/1987 | Gaita |
| 4,751,042 A | | 6/1988 | Ales et al. |
| 5,078,170 A | | 1/1992 | Henry |
| 5,160,173 A | | 11/1992 | Le Devehat |
| 5,209,528 A | | 5/1993 | Weh et al. |
| 5,273,071 A | | 12/1993 | Oberrecht |
| 5,310,226 A | | 5/1994 | Norkey |
| 5,535,984 A | * | 7/1996 | Anderson et al. .......... 251/149.9 |
| 5,628,344 A | | 5/1997 | Roberts |
| 5,954,370 A | | 9/1999 | Pietersen |
| 6,009,901 A | | 1/2000 | Roberts |
| 6,035,894 A | | 3/2000 | Weh et al. |
| 6,068,044 A | | 5/2000 | Fahl |
| 6,155,294 A | | 12/2000 | Cornford et al. |
| 6,626,238 B2 | * | 9/2003 | Hooper ........................... 166/66 |
| 6,964,435 B2 | | 11/2005 | Wolf et al. |
| 7,209,047 B2 | | 4/2007 | Newberg |
| 7,293,758 B2 | | 11/2007 | Hsueh-Feng |
| 7,320,165 B1 | * | 1/2008 | Hard ................................ 29/272 |
| 7,431,346 B2 | | 10/2008 | Frost et al. |
| 7,494,158 B2 | | 2/2009 | Weh et al. |
| 7,497,231 B2 | | 3/2009 | Sasa |
| 7,766,393 B2 | | 8/2010 | Tiberghien et al. |
| 2005/0167981 A1 | | 8/2005 | Nuttall et al. |
| 2008/0217567 A1 | | 9/2008 | Dalluge |
| 2010/0096579 A1 | | 4/2010 | Tausch |
| 2011/0012344 A1 | * | 1/2011 | Tausch et al. ................. 285/316 |

OTHER PUBLICATIONS

"1004D4 Bottom Loading Coupler: Semi-Automatic design makes operation a SNAP!", OPW Engineered Systems, Lebanon, Ohio.

"1004D3/1005E3 API Bottom Loading Coupler", OPW Engineered Systems, H32094PA, Jul. 2009, Lebanon, Ohio.

"1004D2/1005E API Bottom Loading Coupler", OPW Engineered Systems, Part #H32183PA, Feb. 2009, Lebanon, Ohio.

"1004D4 API Bottom Loading Coupler", OPW Engineered Systems, H32096PA, Lebanon, Ohio.

Office Action mailed Jul. 19, 2012 as it relates to U.S. Appl. No. 12/838,163.

* cited by examiner

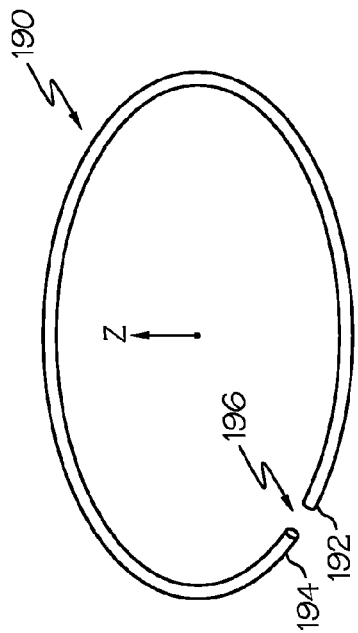
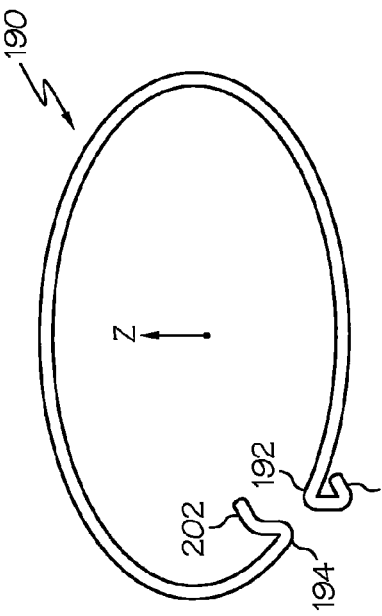
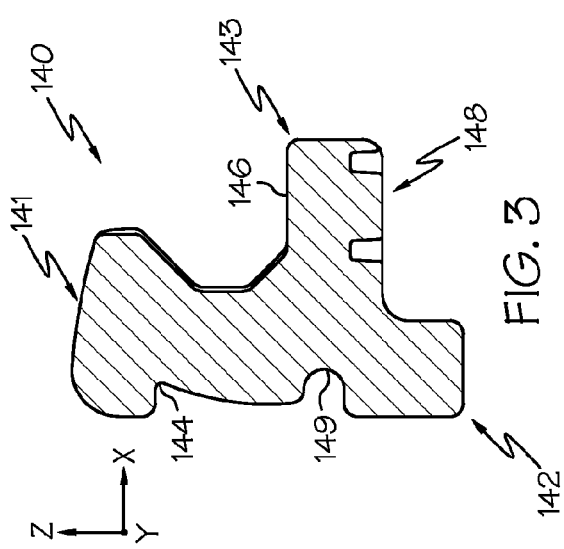
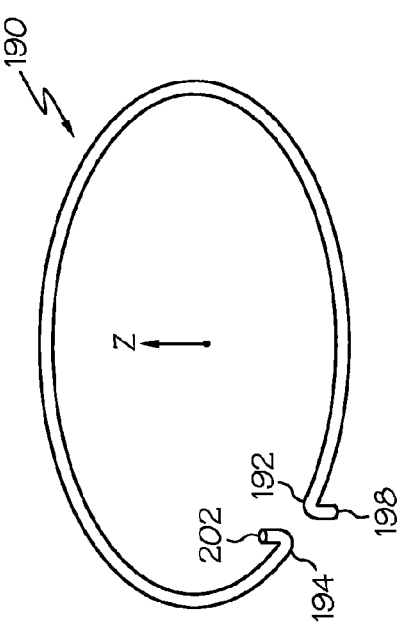

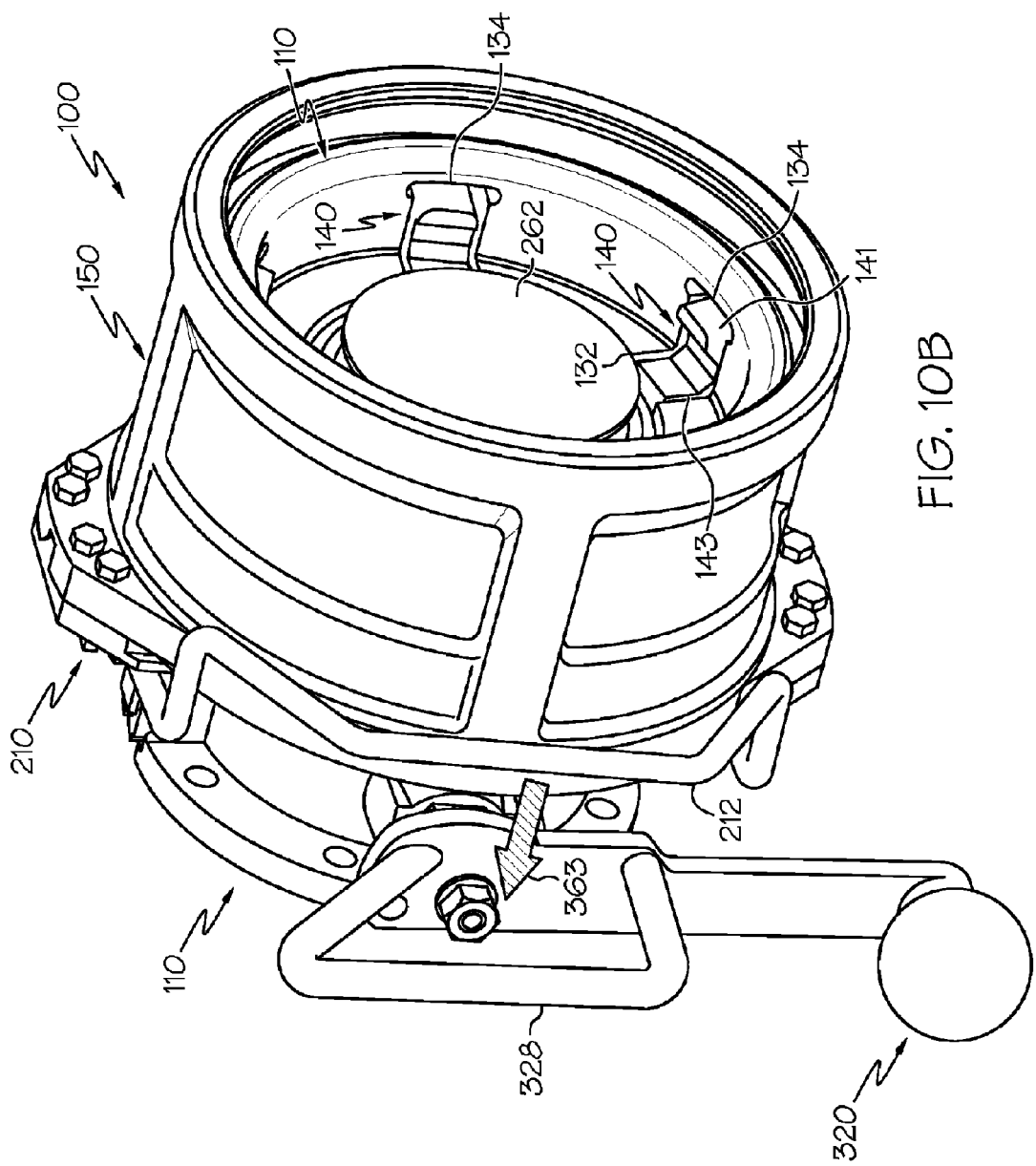

RECOCK HANDLE ASSEMBLIES FOR COUPLER DEVICES AND COUPLER DEVICES COMPRISING THE SAME

CROSS REFERENCE TO RELATED APPLICATIONS

This application claims priority to U.S. Provisional Patent Application Serial No. 61/226,638 filed on Jul. 17, 2009 entitled "COUPLER DEVICES," the entirety of which is herein incorporated by reference. This Application is related to but does not claim priority to: U.S. patent application Ser. No. 12/838,163 filed on Jul. 16, 2010 entitled "COUPLER DEVICES WITH SPRING-LOADED COUPLER SERVICES," the entirety of which is hereby incorporated by reference; U.S. patent application Ser. No. 12/838,088 filed on Jul. 16, 2010 entitled "WEAR RINGS FOR COUPLER DEVICES AND COUPLER DEVICES COMPRISING THE SAME," the entirety of which is hereby incorporated by reference; and U.S. patent application Ser. No. 12/838,057 filed on Jul. 16, 2010 entitled "PIVOT RINGS FOR COUPLER DEVICES AND COUPLER DEVICES COMPRISING THE SAME," the entirety of which is hereby incorporated by reference.

TECHNICAL FIELD

Embodiments of the present disclosure generally relate to bottom loading couplers for fluid transfer and, more specifically, to recock handle assemblies for bottom loading couplers and bottom loading couplers comprising the same.

BACKGROUND

Transferring liquid product from large volume storage tanks into tank trucks or rail cars involves moving the liquid product through a fixed pipeline riser to storage containers of various sizes and orientations located in or on the tank trucks or rail cars. The various configurations of tank trucks and rail cars may require a flexible fluid transfer system such as a loading arm assembly. The loading arm assembly is a section of pipeline capable of handling high flows and line pressures that can be moved both vertically and horizontally to accommodate transport vehicles of various configurations.

One particular method of transferring liquid product through the loading arm involves using a bottom loading coupler to couple loading arm to the storage container of the transport vehicle. The bottom loading coupler attaches to a corresponding adapter located on the vehicle storage container. A poppet valve assembly located in the body of the bottom loading coupler may be used to control the flow of liquid into the storage container. The poppet valve assembly may be actuated using a handle positioned on the outside of the body of the bottom loading coupler. The handle is generally coupled to the poppet valve assembly via a shaft which extends through a bushing positioned in a hole extending through the body of the bottom loading coupler.

An individual engaging existing bottom loading couplers with the adapters of storage containers must perform several manual operations simultaneously to properly engage a bottom loading coupler to an adapter. Performing these manual operations while supporting the weight of the bottom loading coupler may be a difficult task.

Moreover, the moveable parts of the bottom loading coupler may be prone to wear. As the parts wear, the bottom loading coupler may not function properly thus presenting a risk of uncontrolled release of product from the bottom loading coupler.

Accordingly, a need exists for alternative designs for bottom loading couplers and components for bottom loading couplers.

SUMMARY

According to one embodiment, a recock handle assembly for a bottom loading coupler may include a lever portion comprising a first lever arm, a second lever arm and a lever bar oriented in a substantially u-shaped configuration. A handle portion may be joined to the lever portion with a first pivot block and a second pivot block, the handle portion comprising a first connecting leg, a second connecting leg, and a bail. The first connecting leg and the second connecting leg may be positioned in a first plane and the bail is non-coplanar with the first plane. A first base plate may be pivotally coupled to the first pivot block. The first base plate may include a first body guide member and a first sleeve guide member. A second base plate may be pivotally coupled to the second pivot block, the second base plate comprising a second body guide member and a second sleeve guide member.

According to another embodiment, a bottom loading coupler includes a coupler body comprising a stop boss formed on the outer circumference of the coupler body, a plurality of slots extending through a body sidewall of the coupler body and a plurality of interlocks. Each interlock may be positioned in a corresponding slot in the body sidewall and pivotally coupled to the coupler body such that each interlock has an engaged position and a disengaged position with respect to the coupler body. Each interlock may be biased to the disengaged position. A coupler sleeve may be slidably positioned around the coupler body and comprise a loading end and an adapter end. The coupler sleeve may be slidable from a first, retracted position relative to the coupler body to a second, extended position relative to the coupler body. A biasing element may be positioned between the coupler sleeve and the coupler body. The biasing element may bias the coupler sleeve to the second, extended position relative to the coupler body. A recock handle assembly may be pivotally coupled to the loading end of the coupler sleeve. The recock handle assembly may include a lever portion engagable with the stop boss of the coupler body and a handle portion coupled to the lever portion, wherein the recock handle assembly is actuatable to slide the sleeve from the second, extended position to the first, retracted position. The interlocks may be in the disengaged position when the coupler sleeve is in the first, retracted position. The interlocks may be in the engaged position when the coupler sleeve is in the second, extended position.

In yet another embodiment, a bottom loading coupler may include a coupler body comprising a stop boss formed on the outer circumference of the coupler body, a plurality of slots extending through a body sidewall of the coupler body and a plurality of interlocks. Each interlock may be positioned in a corresponding slot in the body sidewall and pivotally coupled to the coupler body such that each interlock has an engaged position and a disengaged position with respect to the coupler body. Each interlock may be biased to the disengaged position. A coupler sleeve may be slidably positioned around the body sidewall of the coupler body and include an interlock retaining seat formed on an inner circumference of the coupler sleeve. The coupler sleeve may be slidable on the coupler body from a first, retracted position relative to the coupler body to a second, extended position relative to the coupler body. A biasing element may be positioned between the coupler sleeve and the coupler body. The biasing element biases the coupler sleeve to the second, extended position relative to the coupler body. A recock handle assembly may be pivotally coupled to the loading end of the coupler sleeve, the recock handle assembly comprising a lever portion engagable with the stop boss of the coupler body and a bail coupled to the lever portion. The recock handle assembly may be actuatable to slide the sleeve from the second, extended position to the first, retracted position. The interlocks may be in the disengaged position and seated in the interlock retaining seat when the coupler sleeve is in the first, retracted position such that the coupler sleeve is retained in the first, retracted position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 schematically depicts an interlock for use in a bottom loading coupler according to one or more embodiments shown and described herein;

FIG. 4A schematically depicts a pivot ring for use in a bottom loading coupler according to one or more embodiments shown and described herein;

FIG. 4B schematically depicts a pivot ring for use in a bottom loading coupler according to one or more embodiments shown and described herein;

FIG. 4C schematically depicts a pivot ring for use in a bottom loading coupler according to one or more embodiments shown and described herein;

FIG. 10B schematically depicts a bottom loading coupler with the coupler sleeve in a second, retracted position relative to the coupler body, the interlocks in an engaged position, the valve operating handle in an open position, and the poppet valve open.

DETAILED DESCRIPTION

Figure 1:
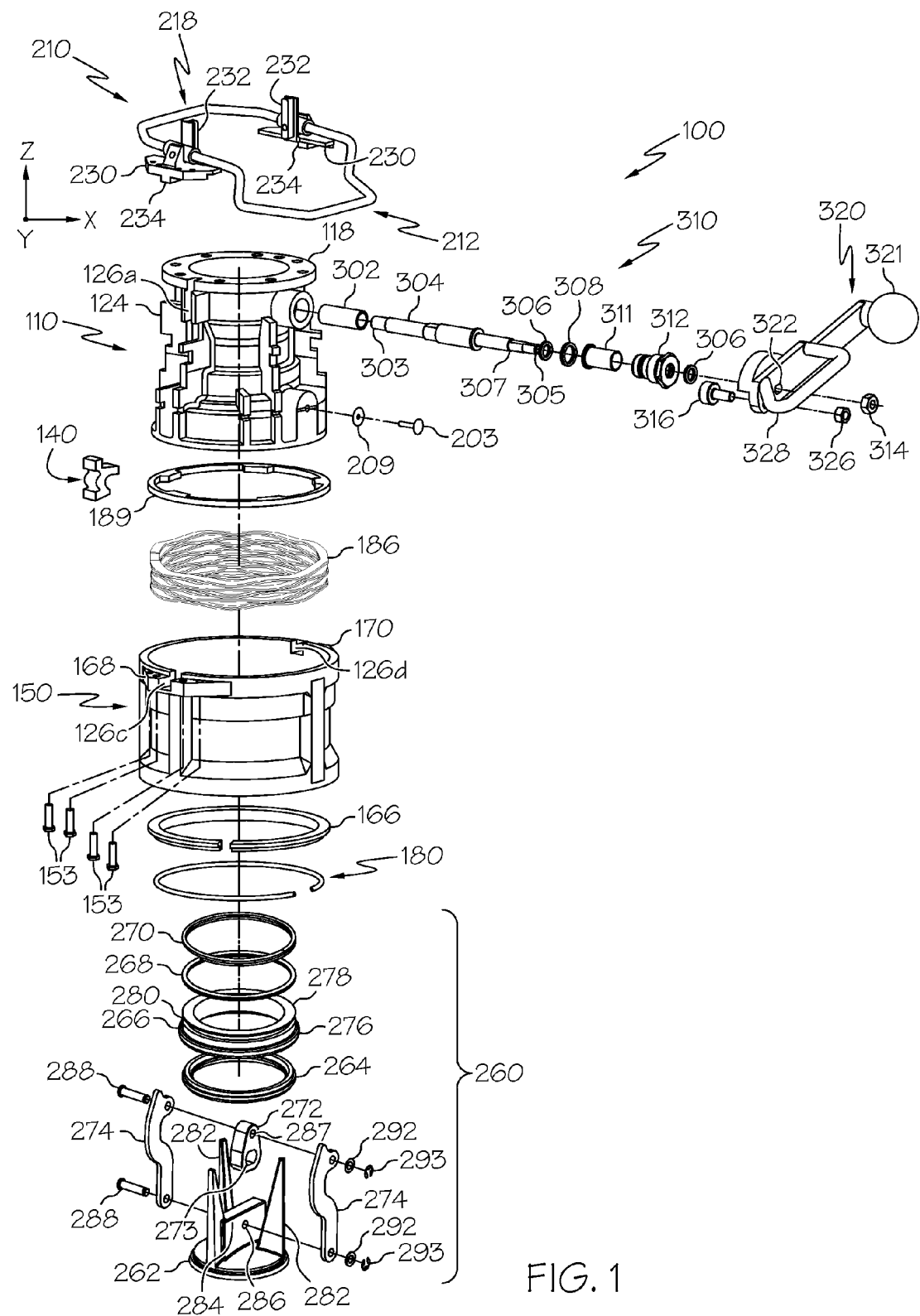
FIG. 1 schematically depicts an exploded view of a bottom loading coupler according to one or more embodiments shown and described herein.

FIG. 1 generally depicts one embodiment of a bottom loading coupler for use in the bulk transfer of fluids. The bottom loading coupler generally comprises a coupler body, a coupler sleeve, a recock handle assembly, an operating handle assembly and a poppet valve assembly. The coupler body may include a plurality of interlocks positioned in slots formed in the coupler body. The interlocks may be positioned in the slots on a pivot ring about which the interlocks may be pivoted. The coupler sleeve may be spring-loaded with respect to the coupler body and comprise a wear ring on an inner circumference of the coupler body. Various embodiments of the bottom loading coupler and the operation of the bottom loading coupler will be described in more detail herein.

Referring now to FIG. 1, an exploded view of one embodiment of a bottom loading coupler 100 is schematically depicted. The bottom loading coupler 100 generally comprises a coupler body 110, a coupler sleeve 150, a poppet valve assembly 260, and an operating handle assembly 310. In the embodiments described herein, the coupler body 110 is formed from a metallic material such as an aluminum alloy or similar material. In one embodiment, the coupler body 110 is formed from an aluminum alloy and coated with an anodized coating.

Figure 2B:
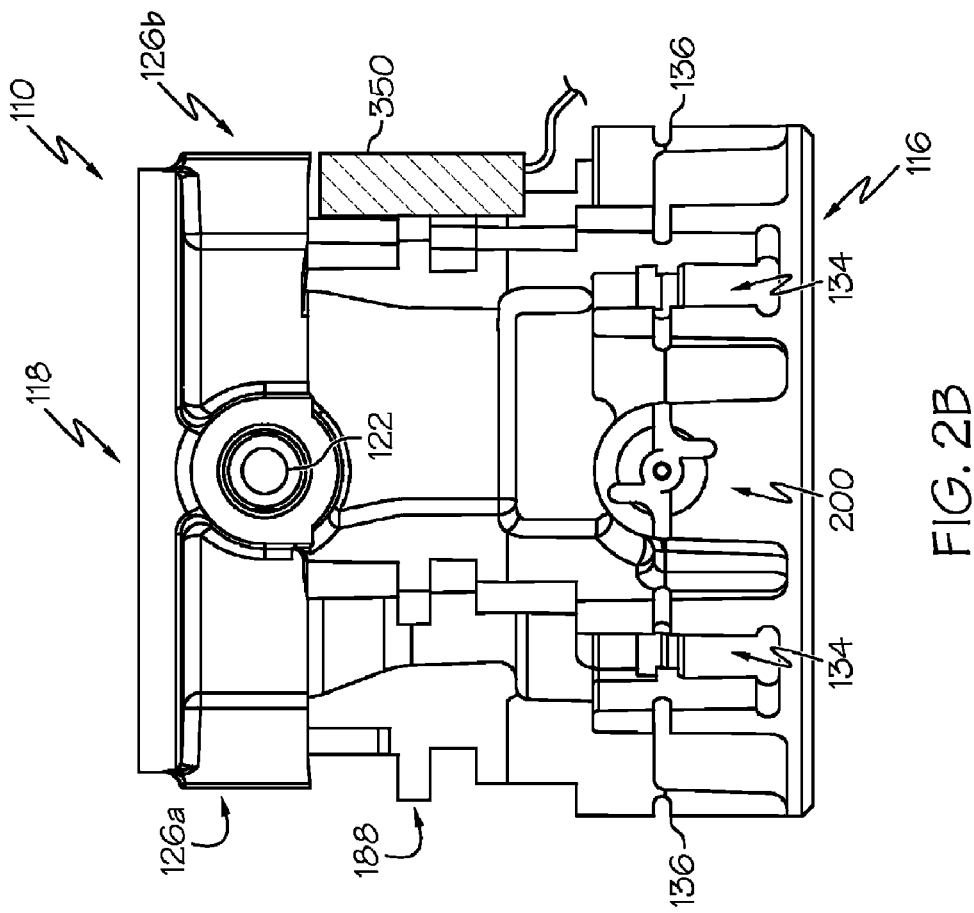
FIGS. 2A and 2B schematically depict a coupler body according to one or more embodiments shown and described herein.
Figure 2A:
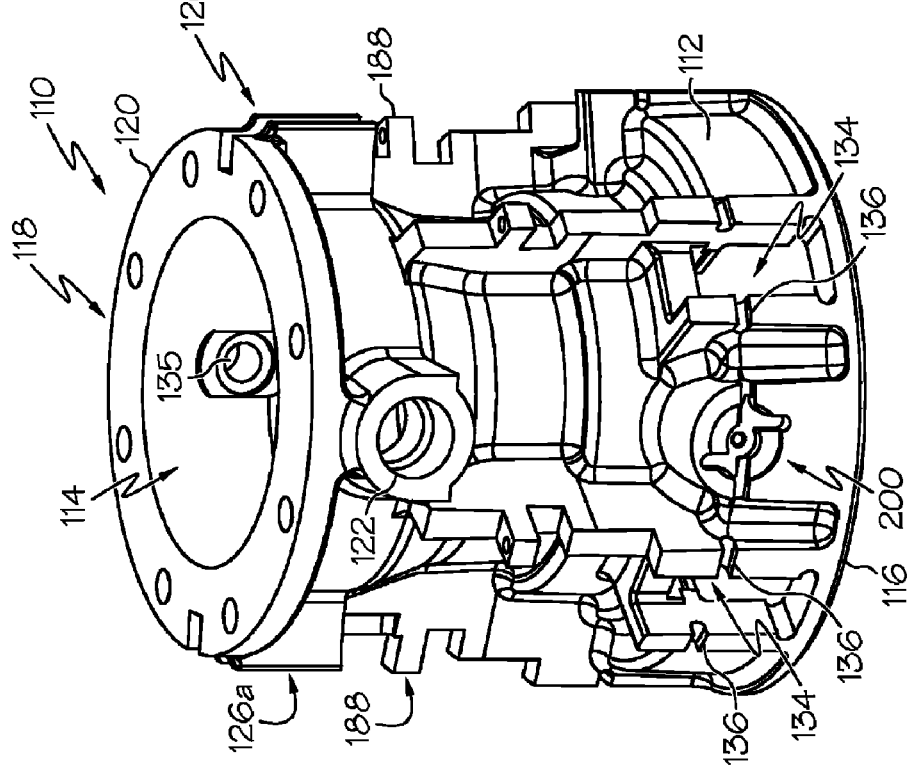
Figure 2D:
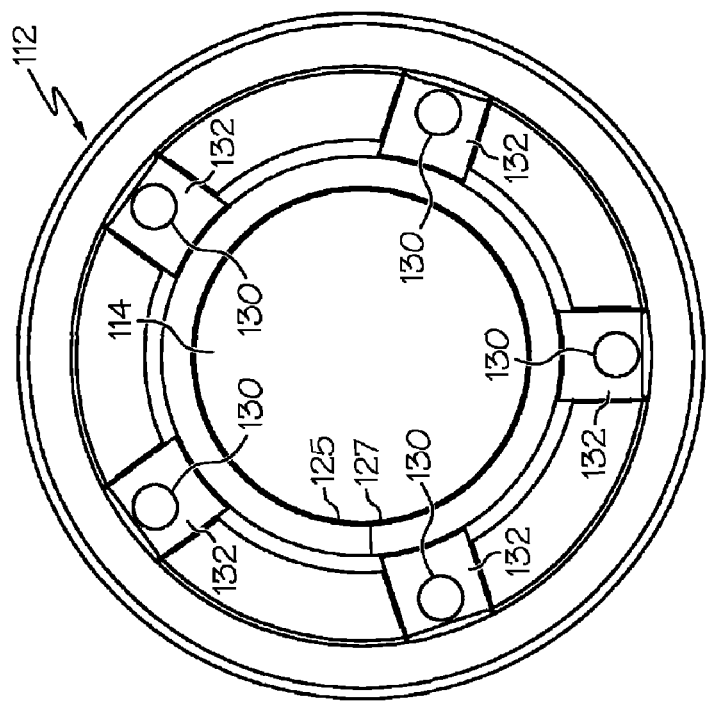
FIG. 2D schematically depicts an adapter end of the coupler body of FIGS. 2A-2C, according to one or more embodiments shown and described herein.
Figure 2C:
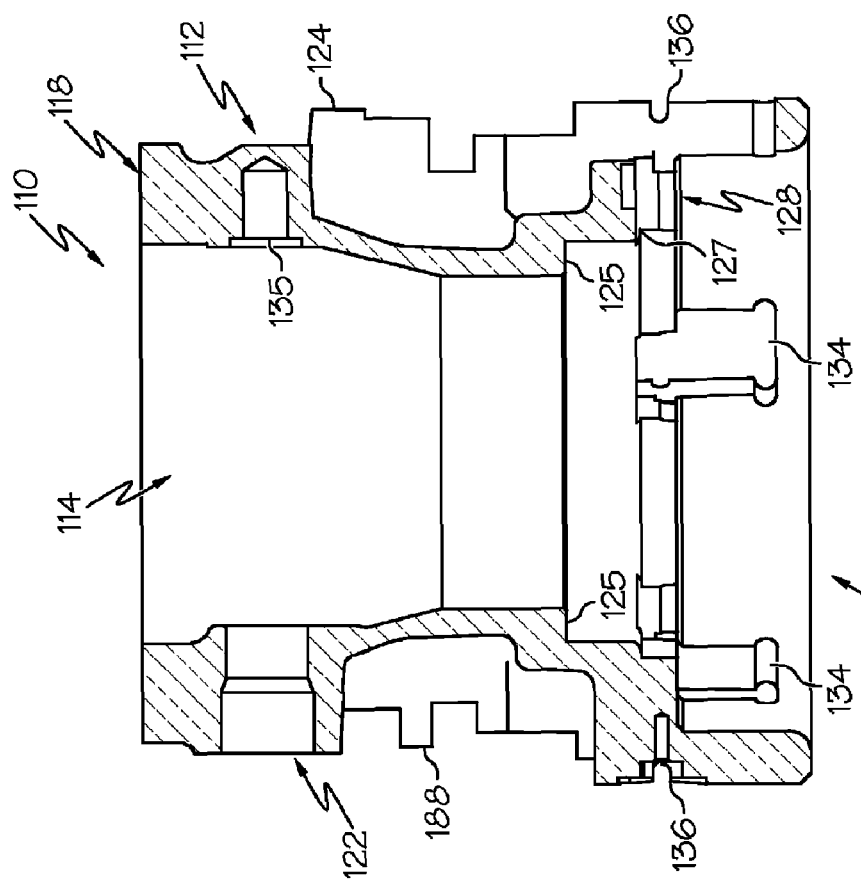
FIG. 2C schematically depicts a cross section of the coupler body shown in FIGS. 2A and 2B according to one or more embodiments shown and described herein.

Referring now to FIGS. 1 and 2A-2D, the coupler body 110 generally comprises a body sidewall 112 which defines a fluid channel 114 extending between an adapter end 116 and a supply end 118. The supply end 118 of the coupler body 110 may be formed with a flanged portion 120. In one embodiment, the flanged portion 120 includes a plurality of through holes in which bolts or other fasteners may be inserted such that the coupler body 110 (and the bottom loading coupler 100) may be removably coupled to a supply conduit (not shown). The coupler body 110 is also formed with an operating handle bore 122 which extends through the body sidewall 112. The operating handle bore 122 is sized to receive an operating handle assembly 310, as will be described in more detail herein. A blind bore 135 is positioned on the inner circumference of the coupler body 110 opposite the operating handle bore 122, as shown in FIGS. 2A and 2C.

In one embodiment, the coupler body 110 also comprises a stop boss 124 formed on an outer circumference of the body sidewall 112 proximate the supply end 118 of the coupler body 110 as depicted in FIGS. 1 and 2C. The stop boss 124 extends radially outward from the body sidewall 112 by a distance greater than the distance the flanged portion 120 extends from the coupler body 110 in the same radial direction. In the embodiment of the coupler body 110 shown in FIGS. 1 and 2C, the stop boss 124 is integrally formed with the coupler body 110. However, in other embodiments (not shown), the stop boss 124 may be removably coupled to the coupler body 110. In embodiments where the bottom loading coupler 100 comprises a recock handle assembly 210, the stop boss 124 acts as a stop for the recock handle assembly 210 and enables the coupler sleeve 150 to be slidably positioned from a second, extended position to a first, retracted position, as will be described in more detail herein.

In the embodiment of the coupler body 110 shown in FIGS. 1 and 2A-2D, the coupler body 110 further comprises a pair of guide elements 126a, 126b formed on the body sidewall 112. The guide elements 126a, 126b are located proximate the supply end 118 of the coupler body 110 on opposite ends of a diameter of the coupler body 110 and generally extend in an axial direction (i.e., the z-direction in the coordinate axes shown in FIG. 1). In the embodiment of the coupler body 110 shown herein, the guide elements 126a, 126b comprise channels formed in the body sidewall 112. The channels extend through the flanged portion 120 and are suitably sized to mate with corresponding guide members of the recock handle assembly 210, as will be described in further detail herein.

Referring to the cross sections of the coupler body 110 shown in FIGS. 2C and 2D, the inner circumference of the coupler body 110 is formed with a poppet spring seat 125 for removably receiving a poppet spring of the poppet valve assembly 260. The inner circumference of the coupler body 110 is also formed with a valve cylinder seat 127 for receiving a valve cylinder of the poppet valve assembly 260.

Referring to the cross sections of the coupler body 110 shown in FIGS. 2C and 2 D, the coupler body 110 is formed with an adapter seat 128 for removably receiving an adapter portion (not shown) of a fluid transfer conduit (not shown). The adapter seat 128 is formed in the adapter end 116 of the coupler body 110. In the embodiment of the coupler body 110 depicted in FIGS. 2C and 2D, the adapter seat 128 is formed with a plurality of interlock recesses 132 in which a plurality of body spring seats 130 are positioned. The interlock recesses 132 are shaped to receive a lever portion of an interlock.

Still referring again to FIGS. 1 and 2A-2D, the coupler body 110 is formed with a plurality of slots 134 positioned about the circumference of the body sidewall 112 proximate the adapter end 116. In the embodiments of the bottom loading coupler 100 described herein, the coupler body 110 comprises a total of five slots 134 which are equidistantly spaced about the circumference of the body sidewall 112. However, it should be understood that more or fewer slots 134 may be formed in the body sidewall 112. The slots 134 extend through the body sidewall 112 and are aligned with the interlock recesses 132 formed in the adapter seat 128. An interlock 140 (FIG. 1) is positioned in each slot 134 and pivotally coupled to the coupler body 110 such that each interlock 140 is pivotable from an engaged position to a disengaged position with respect to the coupler body 110 and, more specifically, with respect to the fluid channel 114 of the coupler body.

Referring now to FIG. 3, an exemplary interlock 140 is shown in cross section. The interlock 140 generally comprises a head portion 141, a tail portion 142, and a lever portion 143. The lever portion 143 extends from the interlock 140 between the head portion 141 and the tail portion 142 and is substantially perpendicular to the tail portion 142 such that the lever portion 143 and the head portion 141 form a "C" shape which facilitates mechanically coupling the interlock 140 to an adapter portion of a fluid transfer conduit (not shown). The lever portion 143 comprises an adapter face 146 and an interlock spring retaining seat 148 formed opposite the adapter face 146. In the embodiments described herein, each interlock 140 is formed with a retention feature 144 in the head portion 141 of the interlock 140 on a side of the interlock 140 opposite the lever portion 143.

Referring now to FIGS. 1-3, in one embodiment, the interlock 140 further comprises a pivot groove 149 positioned in a side of the interlock 140 opposite the lever portion 143. The pivot groove 149 is suitably sized to receive a pivot ring 190 about which the interlock 140 is pivoted. In the embodiments described herein, the pivot groove 149 is substantially linear across the width of the interlock (i.e., in the y-direction indicated in the FIG. 3) such that the circular pivot ring 190 contacts the pivot groove 149 at the ends of the pivot groove. In this embodiment, the coupler body 110 comprises a pivot ring retaining groove 136 formed in an outer circumference of the body sidewall 112. In one embodiment, the pivot ring retaining groove 136 comprises a plurality of discrete grooves positioned about the outer circumference of the body sidewall 112 and aligned with one another in the circumferential direction, as depicted in FIGS. 2A-2C. In an alternative embodiment (not shown), the pivot ring retaining groove 136 may be a continuous groove which extends substantially around the outer circumference of the body sidewall 112. The pivot ring 190 is removably positioned in the pivot ring retaining groove 136 to retain and provide pivotal support for the interlocks 140 positioned in the slots 134 in the body sidewall 112 of the coupler body 110.

Referring now to FIG. 4A, in one embodiment, the pivot ring 190 is substantially circular and is formed from an elastically deformable and recoverable metallic material, such as spring steel or a similar material. The pivot ring 190 comprises a first end 192 and a second end 194 with a discontinuity 196 separating the first end 192 from the second end 194. The discontinuity 196 facilitates elastically deforming the pivot ring 190 such that the pivot ring 190 can be installed around the coupler body 110 and positioned in the pivot ring retaining groove 136.

FIG. 4B depicts another embodiment of a pivot ring 190 where the first end 192 of the pivot ring 190 comprises a first retaining finger 198 and the second end 194 of the pivot ring 190 comprises a second retaining finger 202. In the embodiment shown in FIG. 4B, the first retaining finger 198 and the second retaining finger 202 are oriented such that the first retaining finger 198 and the second retaining finger 202 extend from the respective ends 192, 194 of the pivot ring 190 in the axial direction (i.e., the z-direction shown in FIG. 4B). In the embodiment shown in FIG. 4B, the first retaining finger 198 and the second retaining finger 202 extend in opposite directions. However, in alternative embodiments (not shown) the first retaining finger 198 and the second retaining finger 202 may extend in the same axial direction.

FIG. 4C depicts another embodiment of a pivot ring 190 where the first end 192 of the pivot ring 190 comprises a first retaining finger 198 and the second end 194 of the pivot ring 190 comprises a second retaining finger 202. In the embodiment shown in FIG. 4C, the first retaining finger 198 and the second retaining finger 202 are oriented such that the first retaining finger 198 and the second retaining finger 202 extend from the respective ends 192, 194 of the pivot ring 190 in a radially inward direction (i.e., a direction substantially perpendicular to the z-direction shown in FIG. 4C and towards the center of the pivot ring 190). In the embodiment shown in FIG. 4C, the first retaining finger 198 and the second retaining finger 202 are offset from one another in the z-direction. However, in an alternative embodiment, the first retaining finger 198 and the second retaining finger 202 may be oriented in a single plane which is generally perpendicular to the z-direction.

Figure 5A:
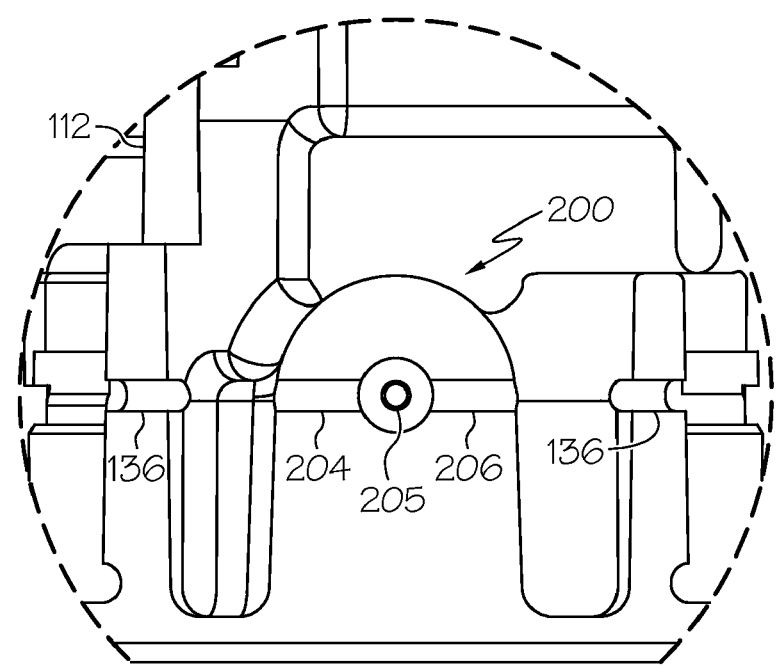
FIG. 5A schematically depicts a pivot ring detent of a coupler body according to one or more embodiments shown and described herein.

Referring to FIGS. 1 and 5A, in one embodiment, where the interlocks 140 are retained in the body sidewall 112 with a pivot ring 190, the body sidewall 112 may further comprise a pivot ring detent 200 formed in the outer circumference of the body sidewall. For example, in one embodiment, the pivot ring detent 200 may be formed with a first detent slot 204 for receiving a first end 192 of the pivot ring 190 and a second detent slot 206 for receiving a second end 194 of the pivot ring 190. The first detent slot 204 and the second detent slot 206 are generally aligned with the pivot ring retaining grooves 136 formed in the body sidewall 112. The pivot ring detent 200 may further comprise a fastener bore 205 formed in the body sidewall 112. In one embodiment, the fastener bore 205 is threaded to receive a corresponding fastener 203 (FIG. 1) which may be threaded into the fastener bore to secure the first and second ends 192, 194 of the pivot ring 190 in the pivot ring detent 200 with a washer 209 (FIG. 1).

Figure 5B:
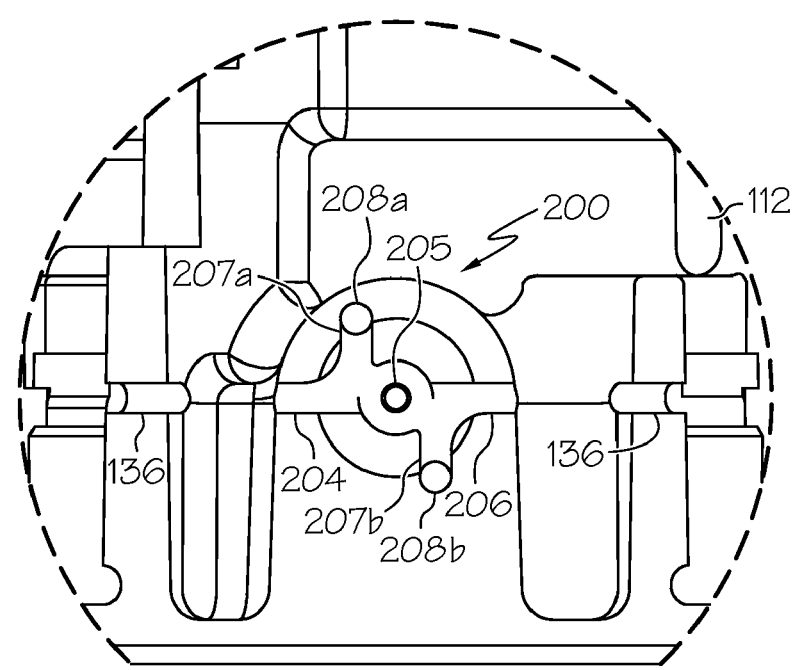
FIG. 5B schematically depicts a pivot ring detent of a coupler body according to one or more embodiments shown and described herein.

Referring now to FIGS. 2B and 5B, in another embodiment, when the pivot ring 190 comprises a pair of axially opposed retaining fingers 198, 202, as depicted in FIG. 4B, the pivot ring detent 200 further comprises a pair of axial detent slots 207a, 207b, which receive the first retaining finger 198 and the second retaining finger 202 of the pivot ring 190 when the ends 192, 194 of the pivot ring 190 are positioned in respective radial detent slots 204, 206. In an alternative embodiment, where the pivot ring 190 also comprises a pair of retaining fingers 198, 202, which extend radially inward, as depicted in FIG. 5B, the pivot ring detent 200 further comprises a pair of radial detent bores 208a, 208b formed in the body sidewall 112. The radial detent bores 208a, 208b are positioned such that the first and second retaining fingers 198, 202 are positioned in respective radial detent bores 208a, 208b when the ends 192, 194 of the pivot ring 190 are positioned in respective radial detent slots 204, 206. The first and second retaining fingers 198, 202 of the pivot ring 190 work in conjunction with the radial detent bores 208a, 208b and/or the axial detent slots to prevent the pivot ring 190 from elastically deforming when a force is applied to the pivot ring 190 in a radial direction when the pivot ring 190 is positioned around the coupler body 110.

Figure 9A:
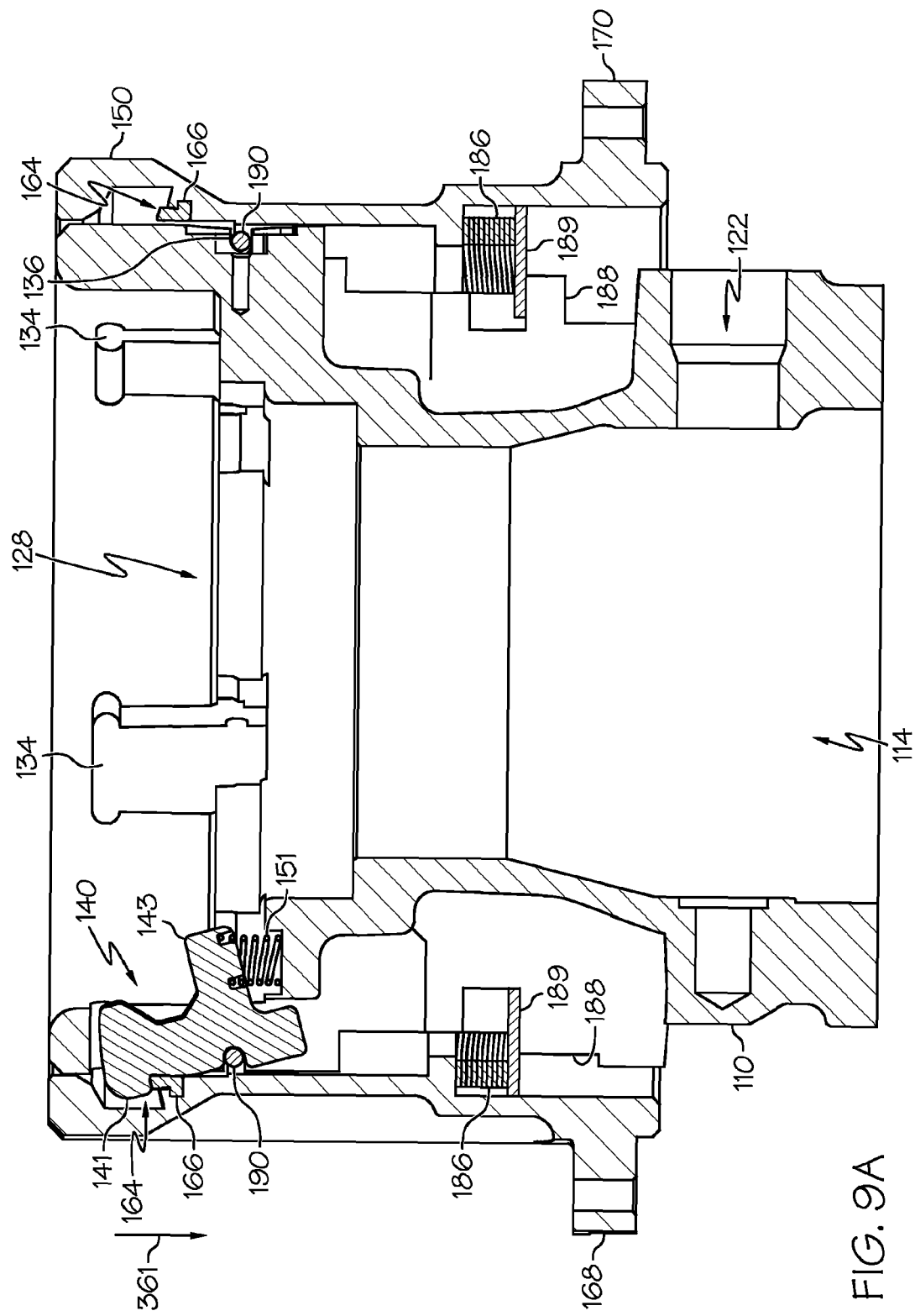
FIG. 9A schematically depicts a cross section of a partially assembled bottom loading coupler with the coupler sleeve in a first, retracted position relative to the coupler body and an interlock in a disengaged position according to one or more embodiments shown and described herein.
Figure 9B:
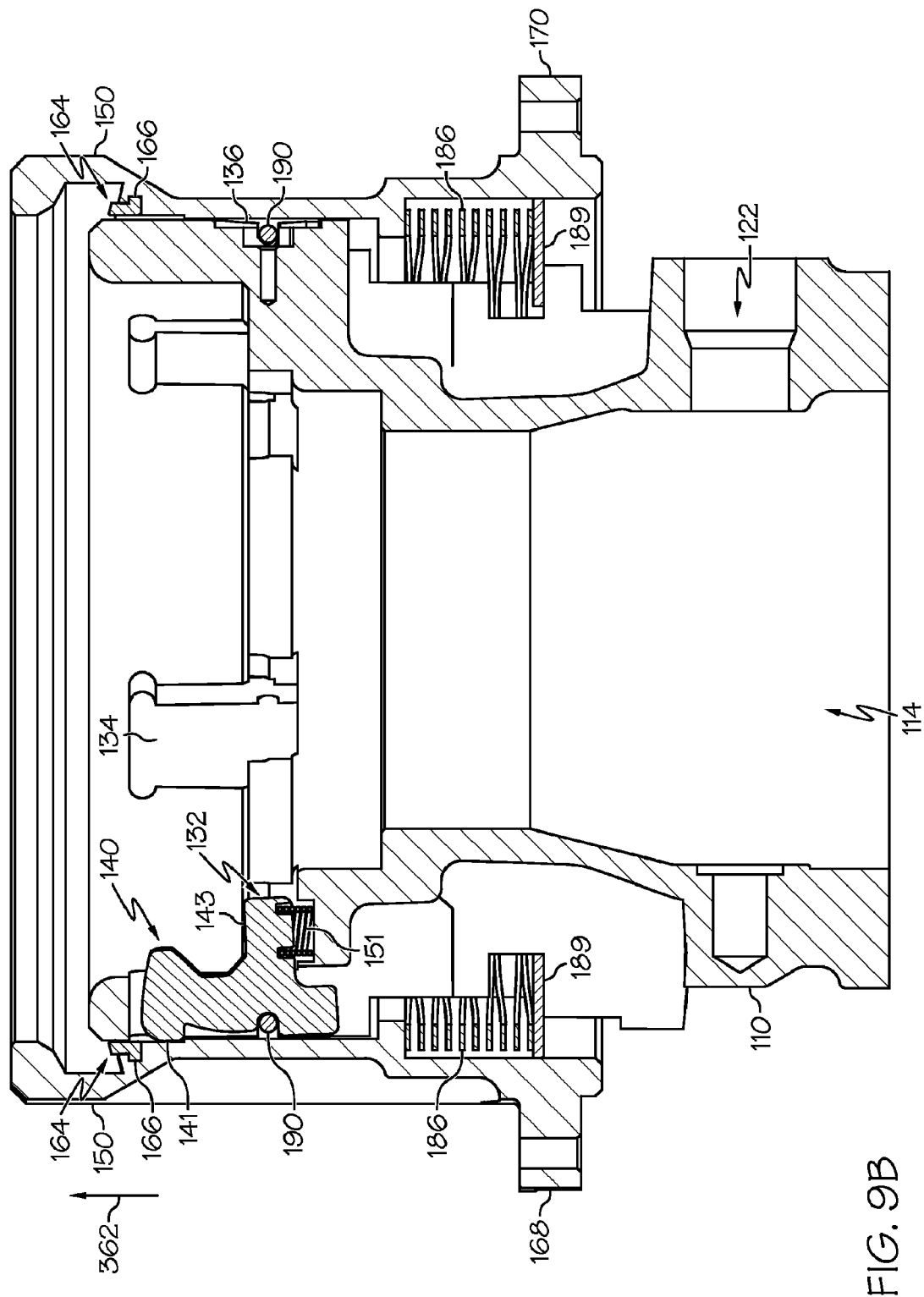
FIG. 9B schematically depicts a cross section of a partially assembled bottom loading coupler with the coupler sleeve in a second, extended position relative to the coupler body and an interlock in the engaged position according to one or more embodiments shown and described herein.

Referring to FIGS. 9A and 9B, in the embodiment of the bottom loading coupler 100 described herein, the pivot ring 190 is positioned around the outer circumference of the coupler body 110 and retained in the pivot ring retaining groove 136. The interlocks 140 are positioned in corresponding slots 134 in the body sidewall 112 and pivotally coupled to the pivot ring 190 such that the interlocks 140 may be pivoted about the pivot ring 190 between an engaged position and a disengaged position. In the embodiments of the coupler body described herein, an interlock is positioned in the engaged position when the head portion 141 of the interlock is rotated towards the fluid channel 114 formed in the coupler body (FIG. 9B) and an interlock is positioned in a disengaged position when the head portion 141 of the interlock 140 is rotated away from the fluid channel formed in the coupler body 110 (FIG. 9A). Further, in the embodiments described herein, the lever portion 143 of each interlock 140 is positioned in a corresponding interlock recess 132 in the adapter seat 128 when the interlock 140 is in the engaged position (FIG. 9B). The interlocks 143 are biased to the disengaged position with a spring 151 positioned between the lever portion 143 of each interlock 140 and the coupler body 110. In the embodiments described herein, the spring 151 is a compression spring which is positioned in the interlock spring retaining seat 148 of each interlock 140 and in the body spring seat of the corresponding interlock recess 132.

While the embodiments of the bottom loading coupler 100 have been described herein as comprising a coupler body 110 with a plurality of interlocks 140 pivotally coupled to the coupler body 110 with a pivot ring 190, it should be understood that, in other embodiments, the interlocks 140 may be pivotally coupled to the coupler body 110 with other mechanisms. For example, in one embodiment (not shown), the interlocks 135 may be individually coupled to the coupler body 110 with pins, such as roll pins or the like, which are inserted through interlock and pivotally coupled to the coupler body 110.

Referring again to FIGS. 1, 2A-2C and 9A-9B, in one embodiment, where the coupler sleeve 150 and the coupler body 110 are spring-biased with respect to one another, the coupler body 110 may further comprise a body retention stop on which a biasing element 186 may be retained. For example, the body retention stop may be a support ring 189 and the outer surface of the coupler body 110 may be formed with a plurality of brackets 188 to which the support ring 189 is attached (FIGS. 1 and 9A-9B). The support ring 189 may be attached to the brackets 188 with screws, clips or similar mechanical fasteners or, alternatively, by welding or similar joining techniques. In another embodiment (not shown), the body retention stop may comprise a support ring which is integrally formed with the coupler body 110. In either embodiment, the body retention stop functions as a seat for a biasing element 186, such as a wave spring or a similar type of spring element. In the embodiments described herein, the support ring 189 contacts the inner circumference of the coupler sleeve 150 such that, as the coupler sleeve 150 slides relative to the coupler body 110, the support ring 189 aligns the coupler body 110 in the coupler sleeve 150 and provides a bearing surface for the coupler sleeve.

Referring to FIG. 2B, in one embodiment, the coupler body 110 further comprises a proximity sensor 350 coupled to the body sidewall 112. For example, the proximity sensor 350 may comprise a proximity sensor manufactured by Pepperl+ Fuchs of Twinsburg, Ohio, such as part number 24681. The proximity sensor 350 is operable to detect the relative position of the coupler sleeve 150 and the coupler body 110 and, as such, provide a signal indicative of when fluid may be safely pumped through the bottom loading coupler 100. For example, in one embodiment, the proximity sensor 350 is positioned to detect the proximity of recock handle assembly 210 (FIG. 1) attached to the coupler sleeve 150 and output a signal to a controller (not shown) which determines if the bottom loading coupler is properly coupled to an adapter such that fluid may be pumped through the bottom loading coupler 100. In one embodiment, the controller prevents fluid from being pumped through the bottom loading coupler 100 until the coupler sleeve is in a second, extended position relative to the coupler body 110 indicating that the coupler is properly connected to a corresponding adapter.

Referring to FIGS. 1, 6A-6B, and 9A-9B, the coupler sleeve 150 is positioned around the coupler body 110 and is slidable between a first, retracted position with respect to the coupler body 110 (FIG. 9A) and a second, extended position with respect to the coupler body 110 (FIG. 9B). The coupler sleeve 150 is generally formed from a metallic material, such as an aluminum alloy or similar material. In one embodiment, the coupler sleeve 150 is formed from an aluminum alloy with an anodized coating. The coupler sleeve 150 is substantially cylindrical with an adapter end 160, a loading end 162 and sleeve sidewall 152 which extends between an inner sleeve circumference 156 and an outer sleeve circumference 158. The coupler sleeve 150 is formed with a first lobe 168 and a second lobe 170 which extend from the sleeve sidewall 152 proximate the loading end 162 of the coupler sleeve 150. In one embodiment (not shown) a pair of manipulating handles may be removably attached to the lobes 168, 170. In another embodiment, a recock handle assembly 210 is coupled to the lobes 168, 170, as depicted in FIG. 1. To facilitate connecting the recock handle assembly 210 to the lobes 168, 170, the lobes may be formed with guide elements 126c, 126d (FIG. 1) configured to mate with corresponding guide members of the recock handle assembly 210. For example, in the embodiments shown herein, the guide elements 126c, 126d are formed as channels to receive a tongue structure of the recock handle assembly 210. In the embodiments of the coupler sleeve shown herein, the coupler sleeve 150 is formed with a sleeve retention stop 154 which extends around the inner sleeve circumference 156. As shown in FIGS. 9A and 9B, a biasing element 186 is positioned between the sleeve retention stop 154 of the coupler sleeve 150 and the support ring 189 of the coupler sleeve 150 such that the coupler sleeve 150 may be spring loaded on the coupler body 110.

Figure 6A:
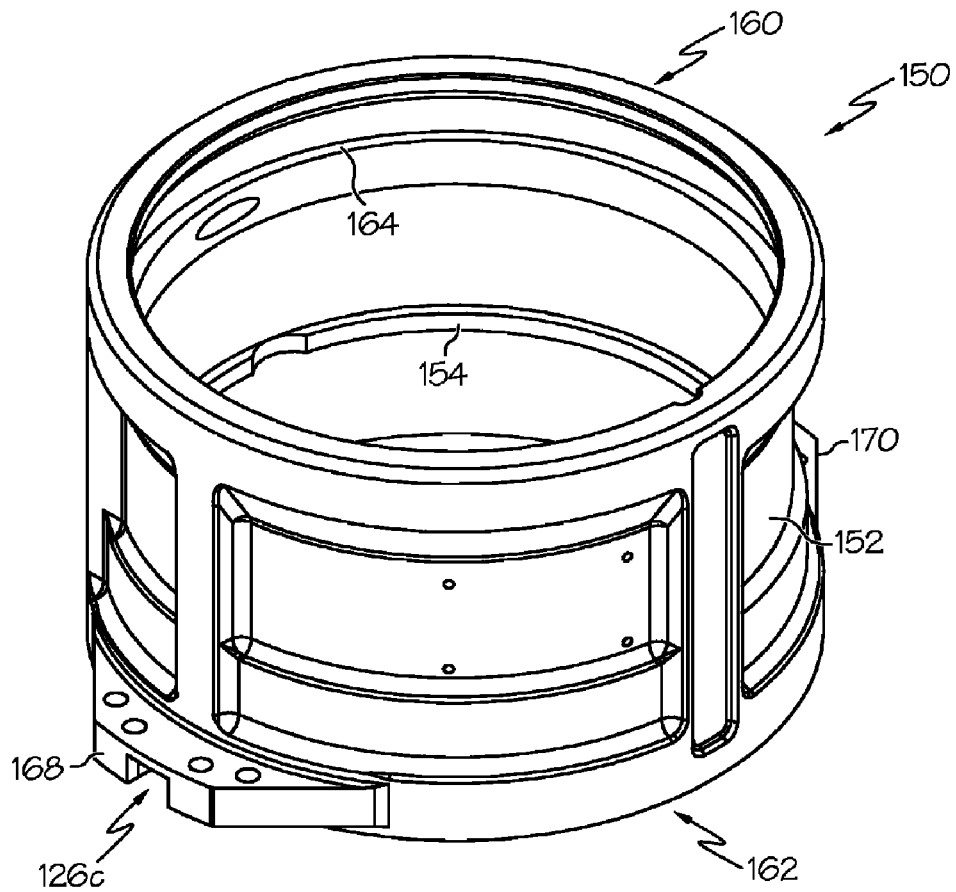
FIG. 6A schematically depicts a coupler sleeve according to one or more embodiments shown and described herein.
Figure 6B:
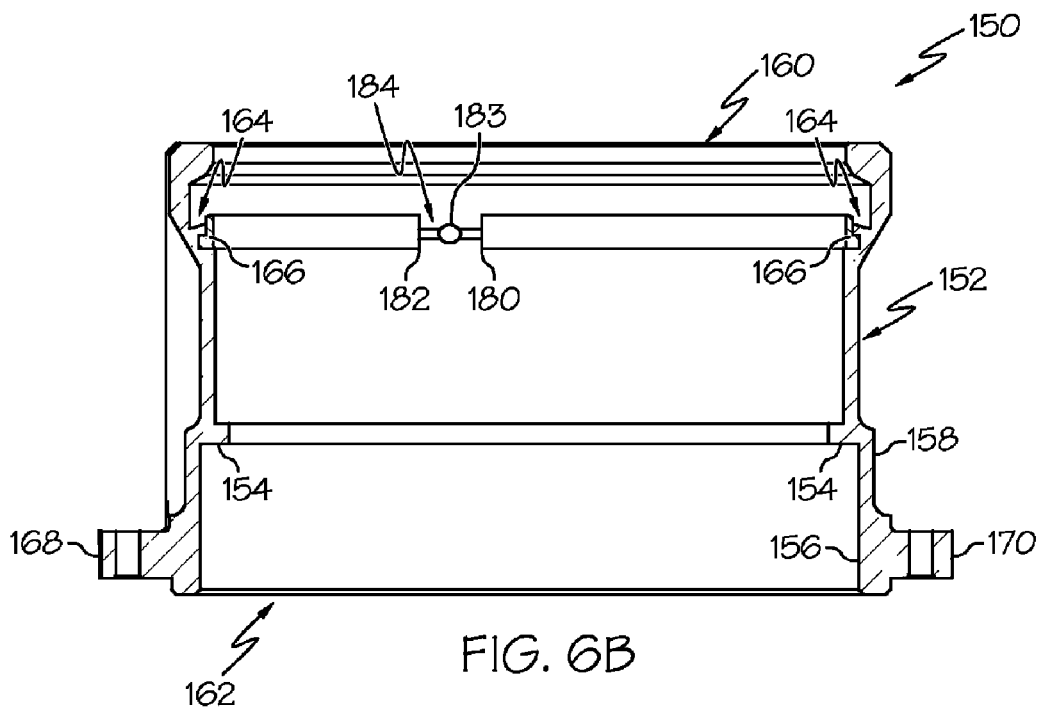
FIG. 6B schematically depicts a cross section of a coupler sleeve according to one or more embodiments shown and described herein.

Still referring to FIGS. 1 and 6A-6B, the coupler sleeve 150 comprises an interlock retaining seat 164 positioned on the inner sleeve circumference 156 proximate the adapter end 160 of the coupler sleeve 150. For example, referring to FIG. 6A, in one embodiment the interlock retaining seat 164 is a channel formed in the inner sleeve circumference 156. The channel is suitably sized such that head portions of the interlocks pivotally coupled to the coupler body 110 may be removably retained in the interlock retaining seat 164 when the interlocks are in a disengaged position with respect to the coupler body 110 and the coupler sleeve is in the first, retracted position with respect to the coupler body 110.

Figure 7A:
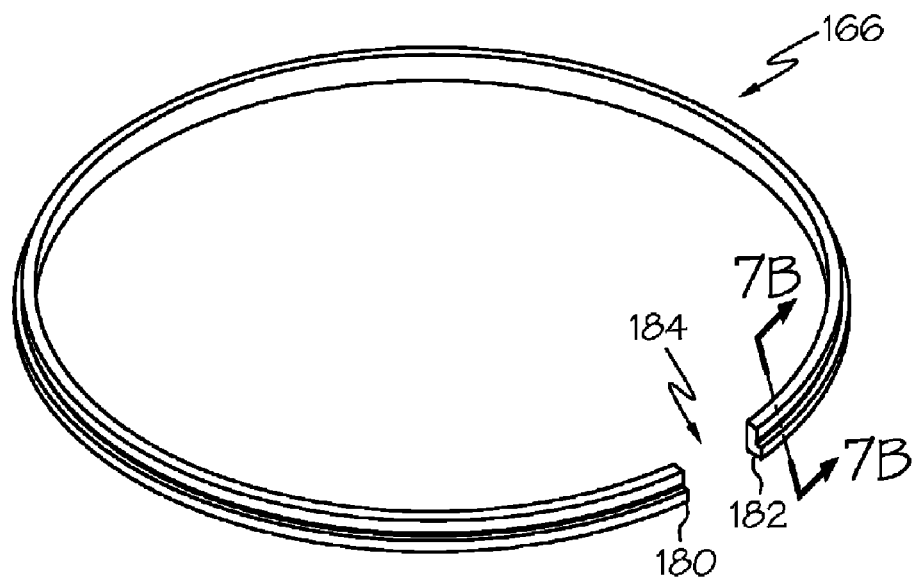
FIG. 7A schematically depicts a wear ring for a coupler body according to one or more embodiments shown and described herein.
Figure 7B:
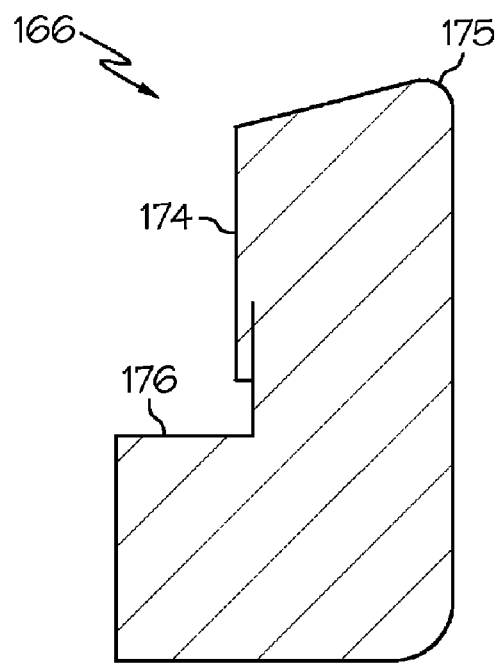
FIG. 7B schematically depicts a cross section of the wear ring of FIG. 7A according to one or more embodiments shown and described herein.

Referring now to FIGS. 6B and 7A-7B, in another embodiment, the interlock retaining seat 164 comprises a wear ring 166 attached to the inner sleeve circumference 156. For example, the wear ring 166 may be positioned on the inner sleeve circumference 156 proximate the adapter end 160 such that a channel is formed between the wear ring 166 and the inner sleeve circumference 156. In this embodiment, the coupler sleeve 150 is formed from a first material and the wear ring 166 is formed from a second material which is harder than the first material. For example, where the coupler sleeve 150 is formed from aluminum, as described herein, the wear ring 166 is formed from a second material which is harder than aluminum. For example, the wear ring 166 may be formed from steel alloys, nickel-based alloys, or nickel-copper alloys. In one embodiment, the wear ring is coated with a metallic coating which has nickel as the primary alloying constituent. In another embodiment, the interlocks positioned in the coupler body 110 are formed from a steel alloy and the wear ring 166 of the coupler sleeve is at least as hard as the steel alloy from which the interlocks 140 are formed.

Still referring to FIGS. 6B and 7A-7B, in one embodiment, the wear ring 166 is removably received in a wear ring receiving channel formed in the inner sleeve circumference 156. For example, in one embodiment the wear ring is formed from an upper wear ring portion 174 and a lower wear ring portion 176. The upper wear ring portion 174 and the lower wear ring portion are substantially perpendicular with one another such that the wear ring 166 is substantially L-shaped in cross section. In one embodiment, the upper wear ring portion 174 has a beveled edge 175 which forms a lip portion of the interlock retaining seat 164 that mates with the corresponding retention feature of the head portion of each interlock to retain the interlock in the interlock retaining seat 164. The lower wear ring portion 176 is removably received in the wear ring receiving channel thereby retaining the wear ring 166 on the inner sleeve circumference 156 and forming the interlock retaining seat 164 between the upper wear ring portion 174 and the inner sleeve circumference 156.

In the embodiments described herein, the wear ring 166 is formed with a discontinuity 184 between a first end 180 of the wear ring 166 and second end 182 of the wear ring 166 such that the wear ring 166 may be elastically deformed to facilitate positioning the wear ring 166 in the wear ring receiving channel. In this embodiment, an anti rotation device 183, such as a pin, screw, rivet or similar device, is positioned in the wear ring receiving channel in the discontinuity to prevent the wear ring 166 from rotating with respect to the coupler sleeve 150. In this embodiment, the wear ring 166 is positioned in the wear ring receiving channel such that the discontinuity does not interfere with the operation of the interlocks 140 located in the coupler body 110.

While the wear ring 166 has been described herein as generally comprising an L-shaped configuration, it should be understood that other configurations of the wear ring 166 are also contemplated. For example, the wear ring 166 may be a closed hoop of metallic material that is attached to the inner sleeve sidewall with an adhesive or by brazing, welding or a similar joining technique to form the interlock retaining seat 164.

In the embodiments in which the coupler sleeve 150 includes a wear ring 166, the wear ring 166 mitigates wear on the inner sleeve circumference 156 and the interlock retaining seat 164 due to sliding contact with the interlocks 140 positioned in the coupler body 110. Thus, the wear ring 166 extends the service life of the coupler sleeve 150 and the bottom loading coupler 100 in which the coupler sleeve 150 is incorporated.

Figure 8:
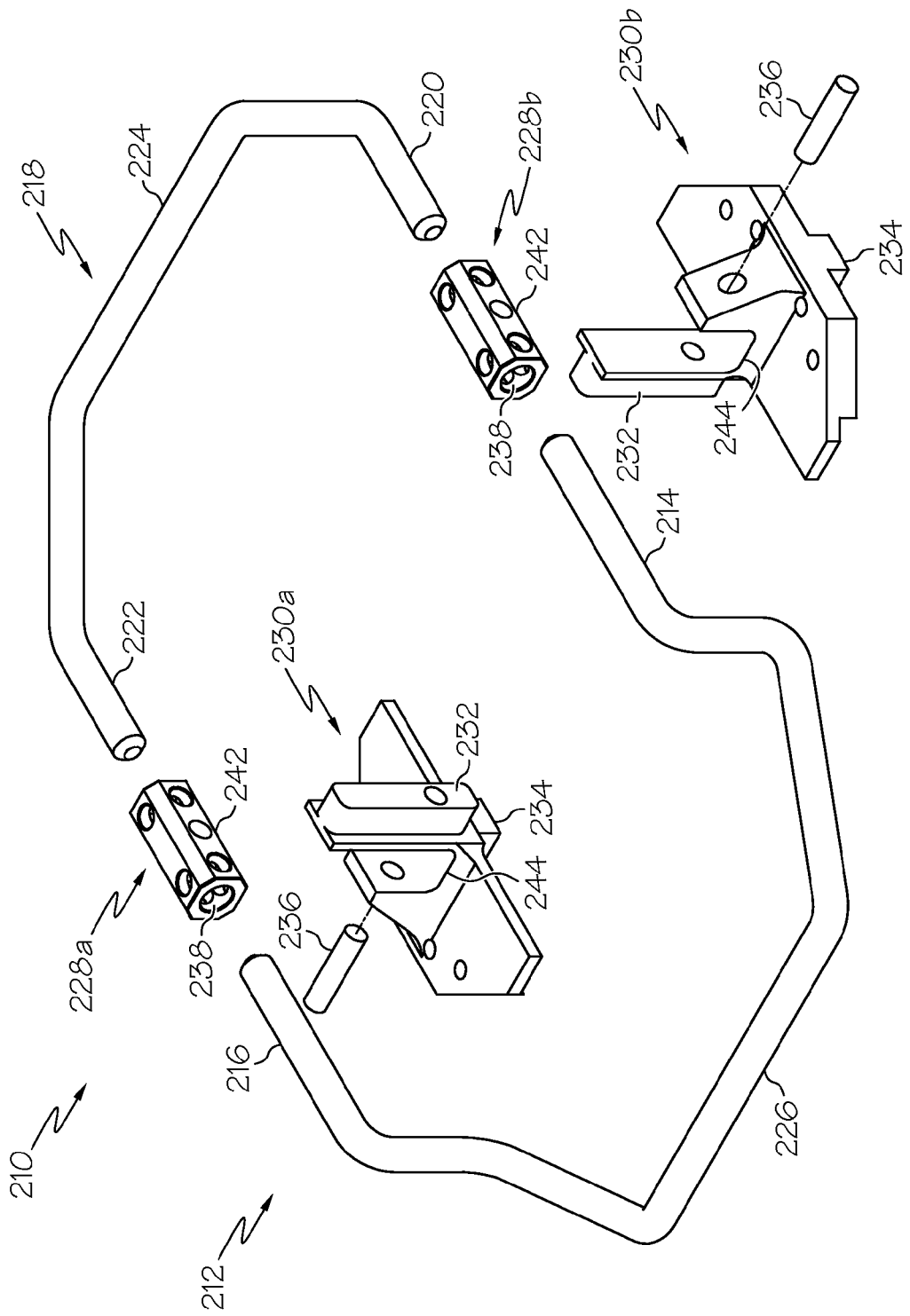
FIG. 8 schematically depicts an exploded view of a recock handle assembly according to one or more embodiments shown and described herein.

Referring now to FIG. 8, one embodiment of a recock handle assembly 210 is schematically depicted. The recock handle assembly 210 generally comprises a handle portion 212 coupled to a lever portion 218 with a first pivot block 228a and a second pivot block 228b. The first pivot block 228a is pivotally coupled to a first base plate 230a and a second base plate 230b. In the embodiment of the recock handle assembly 210 described herein, the lever portion 218 comprises a first lever arm 220, a second lever arm 222 and a lever bar 224 oriented in a substantially U-shaped configuration with the first lever arm 220 parallel with the second lever arm 222. In the embodiments described herein, the lever portion 218 is formed from a single piece of metallic material, such as stainless steel or a similar metallic material, such that the first lever arm 220, the second lever arm 222 and the lever bar 224 are integrally formed with one another. However, it should be understood that, in other embodiments, the first lever arm 220, the second lever arm 222 and the lever bar 224 may be individually formed and joined together, such as by welding or similar joining techniques, to form the lever portion 218.

The handle portion 212 of the recock handle assembly 210 comprises a first connecting leg 214, a second connecting leg 216 and a bail 226 oriented in a substantially U-shaped configuration with the first connecting leg 214 parallel with the second connecting leg 216. Accordingly, it will be understood that the first connecting leg 214 and the second connecting leg 216 are positioned in a first plane. However, the bail 226 is offset from the first connecting leg 214 and the second connecting leg 216 (as shown in FIG. 8) such that the bail 226 is non-coplanar with the plane in which the first connecting leg 214 and the second connecting leg 216 are positioned. In the embodiment of the handle portion 212 shown in FIG. 8, the bail 226 is located in a plane which is substantially parallel with the first connecting leg 214 and the second connecting leg 216. However, it should be understood that the bail 226 may have other configurations with respect to the first connecting leg 214 and the second connecting leg 216. In the embodiments described herein, the handle portion 212 is formed from a single piece of metallic material, such as stainless steel or a similar metallic material, such that the first connecting leg 214, the second connecting leg 216 and the bail 226 are integrally formed with one another. However, it should be understood that, in other embodiments, the first connecting leg 214, the second connecting leg 216 and the bail 226 may be individually formed and joined together, such as by welding or similar joining techniques, to form the handle portion 212.

The pivot blocks 228a, 228b are formed from a metallic material, such as stainless steel or a similar material. In the embodiments shown herein, the pivot blocks 228a, 228b are generally square in cross section. Each pivot block 228a, 228b is formed with a handle bore 238 and a lever bore (not shown) which are generally in opposition to one another. In one embodiment, each pivot block 228a, 228b includes a pivot bore 242 located between the handle bore 238 and the lever bore (not shown). The pivot bore may be substantially perpendicular with the handle bore 238 and the lever bore (not shown). In the embodiments described herein, the first connecting leg 214 of the handle portion 212 is positioned in the handle bore 238 of the first pivot block 228a while the second connecting leg 216 of the handle portion 212 is positioned in the handle bore 238 of the second pivot block 228b. Similarly, the first lever arm 220 of the lever portion 218 is positioned in the lever bore (not shown) of the first connecting block 228a while the second lever arm 222 of the lever portion 218 is positioned in the lever bore (not shown) of the second pivot block 228b. In one embodiment, the first connecting leg 214, the second connecting leg 216, the first lever arm 220, and the second lever arm 222 are each secured in respective pivot blocks 228a, 228b with a weld thereby joining the handle portion 212 to the lever portion 218 via the pivot blocks 228a, 228b. However it should be understood that other joining techniques may be used to secure the lever portion 218 and the handle portion 212 in the pivot blocks 228a, 228b. For example, in an alternative embodiment (not shown) the handle portion 212 and the lever portion 218 are secured in the pivot blocks 228 with threaded fasteners such as screws.

As described herein, the pivot blocks 228a, 228b are pivotally coupled to base plates 230a, 230b. For example, the first pivot block 228a is pivotally coupled to a first base plate 230a while the second pivot block 228b is pivotally coupled to a second base plate 230b. In the embodiments described herein, the base plates 230a, 230b are formed from a metallic material, such as stainless steel or a similar material, and generally comprise a yoke structure 244 in which a pivot block is pivotally connected. For example, referring to FIG. 8, the pivot block 230a is pivotally mounted in the yoke structure 244 of the first base plate 230a with a roll pin 236 which extends through the pivot bore 242 of the first pivot block 228a such that the first pivot block 228a (and the attached lever portion 218 and handle portion 212) are pivotable with respect to the first base plate 230a about the roll pin 236. The second pivot block 228b is attached to the second base plate 230b in a similar manner.

Each base plate 230 comprises a body guide member 232 and a sleeve guide member 234. As shown in FIG. 8, the body guide member 232 and the sleeve guide member 234 of each base plate 230 are generally formed to correspond to the guide elements 126a, 126b (FIGS. 2A, 2B) of the coupler body 110 and the guide elements 126c, 126d of the coupler sleeve 150, respectively. For example, in the embodiments shown herein, the guide elements 126c, 126d are channels and the body guide member 232 and the sleeve guide member 234 are generally formed as corresponding tongue structures. However, it should be understood that, in alternative embodiments, the body guide member 232 and/or the sleeve guide member 234 may be formed as a channel or a groove, such as when the corresponding guide elements are formed as tongue structures. In the embodiments shown herein, the body guide member 232 of each base plate 230 is substantially perpendicular to the sleeve guide member 234.

Figure 10A:
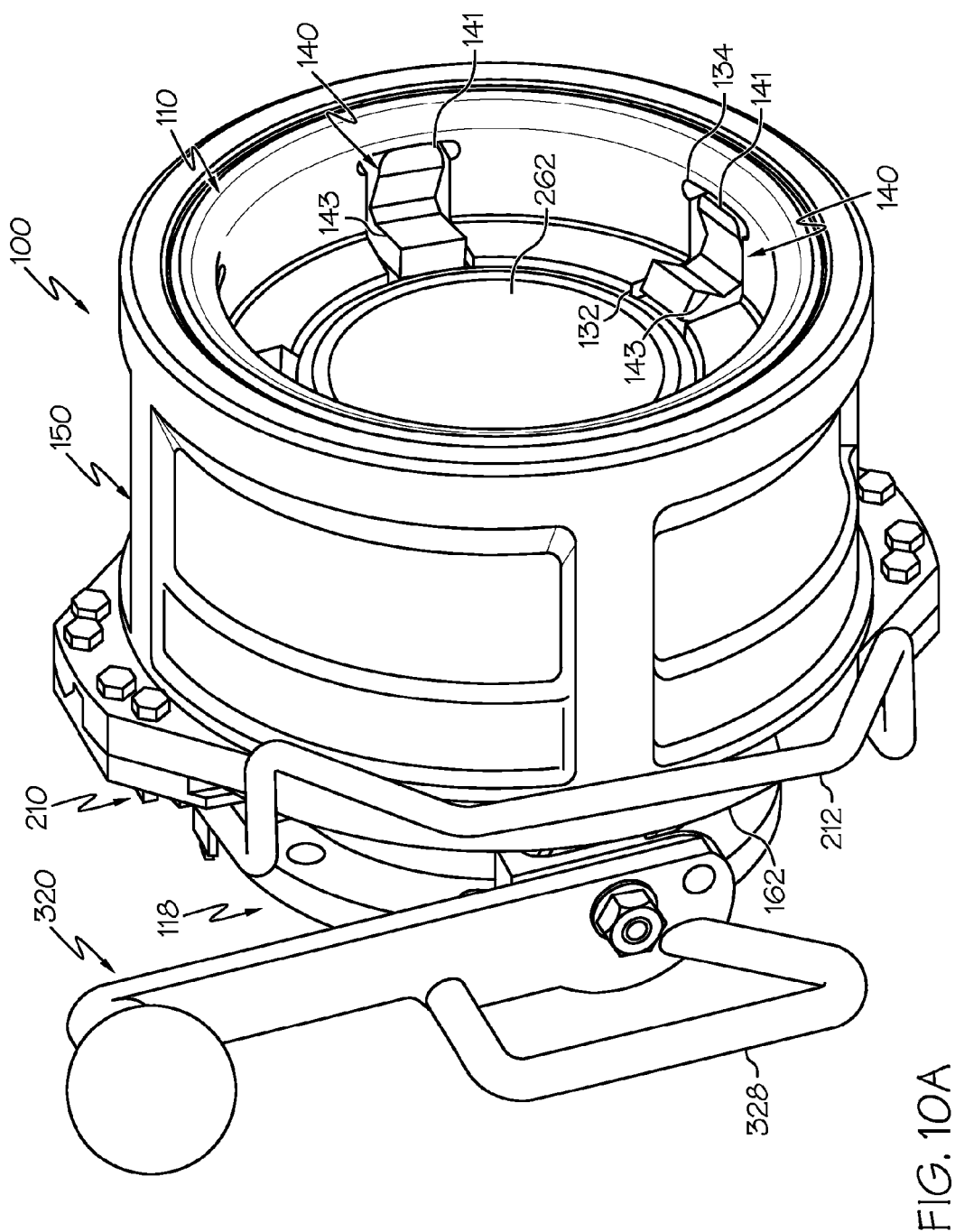
FIG. 10A schematically depicts a bottom loading coupler with the coupler sleeve in a first, retracted position relative to the coupler body, the interlocks in a disengaged position, the valve operating handle in a valve closed position, and the poppet valve closed.

Referring to FIG. 1, the recock handle assembly 210 is attached to the loading end 162 of the coupler sleeve 150 such that, when the lever portion 218 and the handle portion 212 are pivoted in the base plates 230, the lever portion 218 is engagable with the stop boss 124 of the coupler body 110 thereby causing the coupler sleeve 150 to be displaced relative to the coupler body 110. More specifically, in the embodiments shown herein, the base plates 230 of the recock handle assembly are positioned on the lobes 168, 170 of the coupler sleeve 150 such that the sleeve guide members 234 are engaged with the guide elements 126c, 126d of the lobes 168, 170. The base plates 230a, 230b are then affixed to the lobes 168, 170 with fasteners 153, such as bolts. With the base plates 230 positioned on the coupler sleeve 150, the body guide members 232 of the base plates 230 may be slidably engaged with the guide elements 126a, 126d of the coupler body 110. The body guide members 232 interact with the guide elements 126a, 126d of the coupler body 110 to guide coupler sleeve 150 on the coupler body 110 as the coupler sleeve is moved between the first, retracted position and the second, extended position. Further, when the coupler sleeve 150 is in the second, extended position (as shown in FIGS. 9B and 10B), the recock handle assembly 210 may be actuated with the handle portion 212 to engage the lever portion 218 with the stop boss 124 of the coupler body 110 which, in turn, causes the coupler sleeve to slide with respect to the coupler body from the second, extended position to the first, retracted position (as shown in FIGS. 9A and 10A).

While one embodiment of the bottom loading coupler 100 is shown and described herein as comprising a recock handle assembly 210, it should be understood that the recock handle assembly 210 is optional and that, in other embodiments, the bottom loading coupler 100 may be constructed without a recock handle assembly 210. In these embodiments, the coupler sleeve 150 and coupler body 110 may be formed with the appropriate guide elements 126a, 126b, 126c, 126d such that the recock handle assembly 210 may be subsequently added to the bottom loading coupler 100 as an accessory.

Referring now to FIG. 1, one embodiment of the poppet valve assembly 260 is schematically depicted. The poppet valve assembly generally comprises a poppet valve 262, a nose seal 264, a valve cylinder 266, a cylinder O-ring 268, and a poppet spring 270. The poppet valve assembly 260 also comprises a drive link 272 and one or more links 274. However, it should be understood that other embodiments of poppet valve assemblies for use in conjunction with bottom loading couplers may have more or fewer components than those illustrated in FIG. 1. In the illustrated embodiment, the poppet valve 262 is configured to be positioned within the nose seal 264. The nose seal 264 is, in turn, seated in the valve cylinder 266. The first end 276 of the valve cylinder 266 comprises a circumferential flange, as shown in FIG. 1. The cylinder O-ring 268 may be positioned around the valve cylinder 266 within a groove 280 located at a second end 278 of the valve cylinder 266. The poppet spring 270 is positioned between the second end 278 of the valve cylinder 266 and the poppet spring seat 125 formed in the coupler body 110. The flange of the valve cylinder 266 may be seated within the valve cylinder seat 127 formed in the inner circumference of the coupler body 110 (FIG. 2C).

In the embodiments described herein, the poppet valve 262 comprises a plurality of arms 282. When assembled, the arms 282 are positioned in the fluid channel 114 of the coupler body 110 and engage with the valve cylinder 266 to provide guidance to the poppet valve 262. The poppet valve 262 also comprises a vertical coupling plate 284 that includes a pin hole 286 for accepting a coupling pin 288 (e.g., a clevis pin) to couple two links 274 to the poppet valve 262 as illustrated in FIG. 1. The links 274 may comprise a curved portion that allows for the handle shaft to extend across the fluid channel 114 of the coupler body 110. The second end of each link 274 may be coupled to the drive link 272. The drive link 272 comprises a drive link pin hole 287 for accepting a coupling pin 288 (e.g., a clevis pin). The coupling pin 288 may be inserted into a second link hole of each link 274 as well a drive link pin hole 287. The coupling pin may be maintained within the second link holes and drive link pin hole 287 by a washer 292 and E-ring 293 as illustrated in FIG. 1. However, it should be understood that the links 274 may be coupled to the poppet valve 262 and drive link 272 by any known or yet to be developed fasteners.

Still referring to FIG. 1, the bottom loading coupler 100 may further comprise a handle shaft assembly 310 which is positioned in the operating handle bore 122 of the coupler body 110 and mechanically coupled to the poppet valve assembly 260. The handle shaft assembly 310 generally comprises a tube spacer 302, a handle shaft 304, a sleeve bearing 311, a stuff box 312, at least one internal sealing member 306, at least one external sealing member 308, an valve operating handle 320 and a cam follower 316. The tube spacer 302 is a hollow cylindrical shaft configured to receive the handle shaft 304. The handle shaft 304 generally comprises a solid shaft extending between a first end 303 and a second end 305. The first end 303 is sized for insertion into the blind bore 135 of the coupler body 110 (FIG. 2C). The second end 305 of the handle shaft 304 is sized and shaped for insertion in a corresponding opening in the valve operating handle 320 such that the handle shaft is rotationally fixed to the valve operating handle 320 (i.e., the handle shaft 304 rotates with the valve operating handle 320).

The sleeve bearing 311 and the stuff box 312 are positioned on the handle shaft 304. The internal sealing member 306 is disposed between the stuffbox 312 and the handle shaft 304 while the external sealing member 308 is positioned between the stuff box 312 and the operating handle bore 122 of the coupler body 110 when the stuff box 312 is threaded into the operating handle bore 122 thereby preventing fluid loss from the fluid channel 114 through the operating handle bore 122. In one embodiment, the second end 305 of the handle shaft 304 may be threaded such that the handle shaft 304 may be secured to the valve operating handle 320 by a fastener such as a nut 314.

When the handle shaft assembly 310 is positioned in the operating handle bore 122, the handle shaft 304 may be engaged with the drive link 272 of the poppet valve assembly 260 such that the handle shaft 304 is non-rotatable with respect to the drive link. Accordingly, rotation imparted to the handle shaft 304 with the valve operating handle 320 causes displacement of the drive link 272 which, in turn, displaces the poppet valve 262 relative to the coupler body 110 thereby opening or closing the poppet valve 262 in the fluid channel 114. The valve operating handle 320 may comprise an operating knob 321 radially disposed from the axis of rotation of the valve operating handle 320 and an operating bail 328. The valve operating handle 320 generally comprises a hole 322 configured to receive the second end 305 of the handle shaft 304. The valve operating handle 320 also comprises a hole (not shown) for receiving the shaft portion of the cam follower 316.

Still referring to FIG. 1, the assembly of the handle shaft assembly 310 into a bottom loading coupler 100 will now be described. The handle shaft 304 is positioned in the operating handle bore 122 of the coupler body 110 of the bottom loading coupler 100. The first end 303 of the handle shaft 304 is engaged with the drive link slot 273 of the drive link 272 of the poppet valve assembly 260 positioned in the interior of the coupler body 110. Once the tube spacer 302 is positioned on the handle shaft 304, the handle shaft 304 is fully seated in the operating handle bore 122 in the coupler body 110 such that a collar 307 of the handle shaft 304 is positioned perpendicular to a shoulder formed in the operating handle bore 122. In this position, a first end of the tube spacer 302 is disposed within the blind bore 135 and the first end 303 of the handle shaft 304 is positioned in the blind bore 135.

During assembly, the internal sealing members 306 are positioned in seats located in the stuff box 312. The external sealing member 308 is positioned in an annular groove on the exterior surface of the stuff box 312. The sleeve bearing 311 is inserted over the second end of the handle shaft 304. The stuff box 312 is then inserted over the second end 305 of the handle shaft 304. The stuff box 312 is then threaded into the operating handle bore 122 in the coupler body 110. The cam follower 316 is inserted into the valve operating handle 320 and secured with a nut 326. The valve operating handle 320 is then positioned on the second end 305 of the handle shaft 304 such that the handle shaft 304 is engaged with hole 322. The valve operating handle 320 is then secured to the second end 305 of the handle shaft 304 with a threaded fastener such as a nut 314. The valve operating handle may be rotated relative to the coupler body 110 between a valve open position and a valve closed position to actuate the poppet valve assembly 260. Accordingly, it will be understood that, when the valve operating handle is in the open position, the poppet valve 262 is open and, when the valve operating handle is in the closed position, the poppet valve 262 is closed.

The operation of the bottom loading coupler 100 will now be described with specific reference to FIGS. 9A-9B and FIGS. 10A-10B. Referring to FIGS. 9A and 10A, FIG. 9A shows a cross section of a partially assembled bottom loading coupler showing the coupler body 110 positioned in a coupler sleeve 150. FIG. 10A shows an assembled bottom loading coupler 100. In both FIGS. 9A and 10A the coupler sleeve 150 is positioned in the first, retracted position relative to the coupler body 110. With the coupler sleeve 150 in the first, retracted position, the interlock 140 is biased to a disengaged position in which the head portion 141 of the interlock is rotated away from the fluid channel 114 and disposed in the interlock retaining seat 164 formed between the coupler sleeve 150 and the wear ring 166. More specifically, when the coupler sleeve 150 is in the first, retracted position, the spring 151 exerts a force on the lever portion 143 of the interlock 140 causing the interlock to rotate about the pivot ring 190. As the interlock 140 rotates, the lever portion 143 is lifted from the interlock recess 132 and the head portion 141 is retracted into the slot 134 in the sidewall of the coupler body 110, as depicted in FIG. 10A With the coupler sleeve 150 in this position, the biasing element 186 positioned between the coupler sleeve 150 and the support ring 189 of the coupler body 110 is compressed, thereby cocking the coupler sleeve 150 on the coupler body 110. The coupler sleeve 150 is held in the first, retracted position (i.e., the cocked position) by the head portion 141 of the interlock 140 being positioned in the interlock retaining seat 164.

Referring to FIG. 10A, it should be understood that, in order to position the coupler sleeve 150 in the first, retracted position (i.e., to cock the coupler sleeve 150 on the coupler body 110), the valve operating handle 320 must be rotated to the valve closed position as depicted in FIG. 10A such that the poppet valve 262 is closed. When the valve operating handle 320 is in the valve closed position, the coupler sleeve 150 is positioned on the coupler body 110 such that the loading end 162 of the coupler sleeve 150 is in close proximity to the operating handle. With the coupler sleeve 150 in the first, retracted position, the valve operating handle 320 is engagable with the coupler sleeve 150 such that the valve operating handle 320 is not able to be rotated from the valve closed position to the valve open position thereby preventing the poppet valve 262 from being opened.

In embodiments where the coupler body 110 further comprises a proximity sensor 350 (as shown in FIG. 2B) the proximity sensor 350 may provided a signal indicating that the sleeve is in the first, retracted position as depicted in FIGS. 9A and 10A. The signal from the proximity sensor may be received by a control system which prevents fluid from being pumped through the bottom loading coupler 100 based on the positioning of the coupler sleeve 150 in the first, retracted position.

Referring to FIGS. 9B and 10B, FIG. 9B shows a cross section of a partially assembled bottom loading coupler showing the coupler body 110 positioned in a coupler sleeve 150. FIG. 10B shows an assembled bottom loading coupler 100. In both FIGS. 9B and 10B the coupler sleeve 150 is positioned in the second, extended position relative to the coupler body 110. With the coupler sleeve 150 in the second, extended position, the interlock 140 is biased to an engaged position in which the head portion 141 of the interlock 140 is rotated towards the fluid channel 114 and the lever portion 143 of the interlock 140 is seated in the interlock recess 132 formed in the adapter end of the coupler body 110. In this position, the interlock may be engaged with an adapter (not shown) positioned in the bottom loading coupler 100. More specifically, when the coupler sleeve 150 is in the second, extended position, the head portion 141 of the interlock 140 contacts the coupler sleeve 150 which, in turn, exerts a force on the head portion 141 of the interlock 140 causing the interlock to rotate about the pivot ring 190 such that the head portion 141 of the interlock is displaced towards the fluid channel 114. As the interlock 140 rotates, the lever portion 143 seated in the interlock recess 132 and the head portion 141 is extended from the slot 134 in the sidewall of the coupler body 110 thereby positioning the interlock in the engaged position, as depicted in FIG. 10B. With the coupler sleeve 150 in this position, the biasing element 186 positioned between the coupler sleeve 150 and the support ring 189 of the coupler body 110 is un-compressed.

Referring to FIG. 10B, it should be understood that, when the coupler sleeve 150 is in the second, extended position, the valve operating handle 320 may be rotated from a valve closed position (i.e., the position shown in FIG. 10A) to a valve open position (i.e., the position shown in FIG. 10B) such that the poppet valve is open, as depicted in FIG. 10B. However, when the valve operating handle 320 is in the valve open position, the coupler sleeve 150 is positioned on the coupler body 110 such that the loading end 162 of the coupler sleeve 150 in close proximity to the valve operating handle. With the coupler sleeve 150 in the second, extended position and the valve operating handle 320 in the open position (i.e., a non-closed position), the valve operating handle 320 is engagable with the coupler sleeve 150 such that the couple sleeve may not be repositioned to the first, retracted position (as shown in FIG. 10A) while the poppet valve 262 is open thereby preventing the bottom loading coupler 100 from being disengaged from an adapter (not shown) while the poppet valve 262 is open.

In embodiments where the coupler body 110 further comprises a proximity sensor 350 (as shown in FIG. 2B) the proximity sensor 350 may provided a signal indicating that the sleeve is in the second, extended position as depicted in FIGS. 9B and 10B. The signal from the proximity sensor may be received by a control system which permits fluid to be pumped through the bottom loading coupler 100 based on the positioning of the coupler sleeve 150 in the second, extended position.

Referring again to FIGS. 9A-9B and 10A-10B, the coupler sleeve 150 may be transitioned from the first, retracted position to the second, extended position when the bottom loading coupler 100 is engaged with an adapter (not shown), such as an adapter located on a storage container, fuel truck, or the like. Specifically, with the coupler sleeve 150 in the first, retracted position and the interlock 140 in the disengaged position, an adapter can be inserted into the adapter seat 128 of the coupler body 110. As the adapter is inserted, the adapter contacts the lever portion 143 of each interlock causing the interlock 140 to rotate towards the engaged position. Specifically, as the adapter contacts the lever portion 143, the interlock pivots about the pivot ring 190 as the lever portion is rotated into the interlock recess 132 and the spring 151 is compressed. Rotation of the interlock 140 disengages the interlock 140 from the interlock retaining seat 164 as the head portion 141 of the interlock rotates towards the fluid channel 114. Once the head portion 141 is disengaged from the interlock retaining seat 164, the biasing element 186 expands, sliding the coupler sleeve in the direction of the arrow 362 and positioning the sleeve in the second, extended position and the interlock 140 in the engaged position, as depicted in FIG. 9B. With the coupler sleeve 150 in the second, extended position, the interlock 140 is engaged with the adapter (not shown) positioned in the coupler body 110 and the valve operating handle 320 may be rotated from the valve closed position to the valve open position thereby opening the poppet valve 262 as shown in FIG. 10B.

Once the loading operation has been complete, the valve operating handle 320 is rotated from a valve open position to a valve closed position (i.e., as shown in FIG. 10A) thereby closing the poppet valve 262. Once the poppet valve 262 is closed, the coupler sleeve 150 may be recocked with respect to the coupler body 110. Specifically, an operator may grasp the operating bail 328 and the handle portion 212 of the recock handle assembly 210 and, by squeezing them together, slide the coupler sleeve 150 in the direction shown by arrow 363 in FIG. 10B thereby disengaging the bottom loading coupler from the adapter. As the coupler sleeve 150 is displaced on the coupler body 110 in the direction of arrow 361, the head portion of the interlock 140 slides along the inside of the coupler sleeve 150 and over the wear ring 166 until the head portion 141 of the interlock 140 is biased into the interlock retaining seat 164 by the spring 151 thereby returning the interlock 140 to the disengaged position. With the interlock 140 in the disengaged position, the interaction between the head portion 141 of the interlock 140 and the wear ring 166 holds the sleeve in the first, retracted position keeping the coupler sleeve 150 cocked with respect to the coupler body 110.

In the embodiments of the bottom loading coupler shown an described herein, the bottom loading coupler includes a recock handle assembly and a biasing element such that the coupler sleeve may be spring-loaded with respect to the coupler body. However, in another embodiment, the bottom loading coupler may be assembled without the recock handle assembly or the biasing element. In this embodiment, the components which facilitate spring-loading the coupler sleeve with respect to the coupler body may be supplied as a kit of parts which may be used to convert a conventional bottom loading coupler to a bottom loading coupler with a spring loaded sleeve. For example, the kit of parts may include a biasing element and a recock handle assembly. Alternatively, the kit of parts may also include a proximity sensor for detecting the relative position of the coupler sleeve with respect to the coupler body.

While embodiments of the bottom loading coupler are depicted with a wear ring, pivot ring, recock handle assembly and biasing element with a corresponding support ring, it should be understood that the various components of the bottom loading couplers described herein may be utilized in a bottom loading coupler in various combinations. For example, various combinations of the wear ring, pivot ring, recock handle assembly and biasing element may be incorporated in a bottom loading coupler to facilitate various functional embodiments of bottom loading couplers.

Further, it should also be understood that the embodiments described herein provide for bottom loading couplers with improved functionality. Specifically, in embodiments where the bottom loading coupler includes a wear ring, the wear ring reduces wear on the internal surface of the coupler sleeve thereby extending the service life of the bottom loading coupler. In embodiments where the bottom loading coupler includes a pivot ring, the pivot ring improves the ease of disassembling and assembling the bottom loading coupler thereby reducing the maintenance costs associated with servicing the coupler and decreasing coupler down-time. In embodiments where the bottom loading coupler includes a coupler sleeve which is spring-loaded with respect to the coupler body, the bottom loading coupler may be attached to an adapter without multiple manual operations by simply placing the coupler sleeve on the adapter. Moreover, in embodiments where the coupler sleeve comprises a recock handle assembly, the recock handle assembly facilitates cocking the coupler sleeve on the coupler body without multiple manual operations.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A recock handle assembly for a bottom loading coupler, the recock handle assembly comprising:
    a lever portion comprising a first lever arm, a second lever arm and a lever bar oriented in a substantially u-shaped configuration;
    a handle portion joined to the lever portion with a first pivot block and a second pivot block, the handle portion comprising a first connecting leg, a second connecting leg, and a bail, wherein the first connecting leg and the second connecting leg are positioned in a first plane and the bail is non-coplanar with the first plane, the first pivot block comprises a first handle bore for receiving the first connecting leg of the handle portion and a first lever bore for receiving the first lever arm of the lever portion, and the second pivot block comprises a second handle bore for receiving the second connecting leg of the handle portion and a second lever bore for receiving the second lever arm of the lever portion;
    a first base plate pivotally coupled to the first pivot block with a first roll pin, the first base plate comprising a first body guide member and a first sleeve guide member, wherein the first body guide member is substantially perpendicular to the first sleeve guide member; and
    a second base plate pivotally coupled to the second pivot block with a second roll pin, the second base plate comprising a second body guide member and a second sleeve guide member, wherein the second body guide member is substantially perpendicular to the second sleeve guide member.

2. The recock handle assembly of claim 1 wherein the lever portion is coplanar with the first plane.

3. The recock handle assembly of claim 1 wherein:
    the first pivot block comprises a first pivot bore located between the first handle bore and the first lever bore; and
    the second pivot block comprises a second pivot bore located between the second handle bore and the second lever bore.

4. The recock handle assembly of claim 3 wherein:
    the first pivot bore is perpendicular to the first handle bore and the first lever bore; and
    the second pivot bore is perpendicular to the second handle bore and the second lever bore.

5. A bottom loading coupler comprising:
    a coupler body comprising a stop boss formed on an outer circumference of the coupler body, a plurality of slots extending through a body sidewall of the coupler body and a plurality of interlocks, wherein each interlock is positioned in a corresponding slot in the body sidewall and pivotally coupled to the coupler body such that each interlock has an engaged position and a disengaged position with respect to the coupler body, wherein each interlock is biased to the disengaged position;
    a coupler sleeve slidably positioned around the coupler body and comprising a loading end and an adapter end, wherein the coupler sleeve is slidable from a first, retracted position relative to the coupler body to a second, extended position relative to the coupler body;
    a biasing element positioned between the coupler sleeve and the coupler body, wherein the biasing element biases the coupler sleeve to the second, extended position relative to the coupler body; and a recock handle assembly pivotally coupled to the loading end of the coupler sleeve, the recock handle assembly comprising a lever portion engagable with the stop boss of the coupler body and a handle portion coupled to the lever portion, wherein:

the lever portion comprises a first lever arm, a second lever arm and a lever bar oriented in a substantially u-shaped configuration; the handle portion is joined to the lever portion with a first pivot block and a second pivot block, the handle portion comprising a first connecting leg, a second connecting leg, and a bail, wherein the first connecting leg and the second connecting leg are positioned in a first plane and the bail is non-coplanar with the first plane; a first base plate mounted to the loading end of the coupler sleeve and pivotally coupled to the first pivot block, the first base plate comprising a first body guide member slidably coupled to the coupler body and a first sleeve guide member slidably coupled to the coupler sleeve, wherein the first body guide member is substantially perpendicular to the first sleeve guide member; and a second base plate mounted to the loading end of the coupler sleeve and pivotally coupled to the second pivot block, the second base plate comprising a second body guide member slidably coupled to the coupler body and a second sleeve guide member slidably coupled to the coupler sleeve, wherein the second body guide member is substantially perpendicular to the second sleeve guide member; the recock handle assembly is actuatable to slide the coupler sleeve from the second, extended position to the first, retracted position;

the interlocks are in the disengaged position when the coupler sleeve is in the first, retracted position; and the interlocks are in the engaged position when the coupler sleeve is in the second, extended position.

6. The bottom loading coupler of claim 5 further comprising a proximity sensor positioned between an inner circumference of the coupler sleeve and the outer circumference of the coupler body, wherein the proximity sensor outputs a signal indicative of a relative position of the coupler sleeve and the coupler body.

7. The bottom loading coupler of claim 5 wherein the lever portion is coplanar with the first plane.

8. The bottom loading coupler of claim 5 wherein:

the first pivot block comprises a first handle bore for receiving the first connecting leg of the handle portion and a first lever bore for receiving the first lever arm of the lever portion; and the second pivot block comprises a second handle bore for receiving the second connecting leg of the handle portion and a second lever bore for receiving the second lever arm of the lever portion.

9. The bottom loading coupler of claim 8 wherein:

the first pivot block comprises a first pivot bore located between the first handle bore and the first lever bore; and the second pivot block comprises a second pivot bore located between the second handle bore and the second lever bore.

10. The bottom loading coupler of claim 9 wherein:

the first pivot bore is perpendicular to the first handle bore and the first lever bore; and the second pivot bore is perpendicular to the second handle bore and the second lever bore.

11. The bottom loading coupler of claim 5 further comprising a poppet valve assembly disposed in the coupler body and mechanically coupled to a valve operating handle positioned on the coupler body, the valve operating handle having a valve open position and a valve closed position, wherein:

the poppet valve assembly is closed when the valve operating handle is in the valve closed position;

the poppet valve assembly is open when the valve operating handle is in the valve open position;

the coupler sleeve is engaged with the valve operating handle when the valve operating handle is in the valve closed position and the coupler sleeve is in the first, retracted position thereby preventing the valve operating handle from being rotated to the valve open position; and the valve operating handle is engaged with the coupler sleeve when the coupler sleeve is in the second, extended position and the valve operating handle is in a non-closed position thereby preventing the coupler sleeve from being positioned in the first, retracted position.

12. A bottom loading coupler comprising:

a coupler body comprising a stop boss formed on an outer circumference of the coupler body, a plurality of slots extending through a body sidewall of the coupler body and a plurality of interlocks, wherein each interlock is positioned in a corresponding slot in the body sidewall and pivotally coupled to the coupler body such that each interlock has an engaged position and a disengaged position with respect to the coupler body, wherein each interlock is biased to the disengaged position;

a coupler sleeve slidably positioned around the body sidewall of the coupler body and comprising an interlock retaining seat formed on an inner circumference of the coupler sleeve, wherein the coupler sleeve is slidable on the coupler body from a first, retracted position relative to the coupler body to a second, extended position relative to the coupler body; and a biasing element positioned between the coupler sleeve and the coupler body, wherein the biasing element biases the coupler sleeve to the second, extended position relative to the coupler body; a poppet valve assembly disposed in the coupler body and mechanically coupled to a valve operating handle positioned on the coupler body, the valve operating handle having a valve open position and a valve closed position;

a recock handle assembly pivotally coupled to a loading end of the coupler sleeve, the recock handle assembly comprising a lever portion engagable with the stop boss of the coupler body and a handle portion coupled to the lever portion, wherein: the lever portion comprises a first lever arm, a second lever arm and a lever bar; the handle portion is joined to the lever portion with a first pivot block and a second pivot block, the handle portion comprising a first connecting leg, a second connecting leg, and a bail; a first base plate mounted to the loading end of the coupler sleeve and pivotally coupled to the first pivot block, the first base plate comprising a first body guide member slidably coupled to the coupler body and a first sleeve guide member slidably coupled to the coupler sleeve wherein the first body guide member is substantially perpendicular to the first sleeve guide member; a second base plate mounted to the loading end of the coupler sleeve and pivotally coupled to the second pivot block, the second base plate comprising a second body guide member slidably coupled to the coupler body and a second sleeve guide member slidably coupled to the coupler sleeve, wherein the second body guide member is substantially perpendicular to the second sleeve guide member;

the recock handle assembly is actuatable to slide the coupler sleeve from the second, extended position to the first, retracted position; and the interlocks are in the disengaged position and seated in the interlock retaining seat when the coupler sleeve is in the first, retracted position such that the coupler sleeve is retained in the first, retracted position.

13. The bottom loading coupler of claim 12 further comprising a proximity sensor positioned between the inner circumference of the coupler sleeve and the outer circumference of the coupler body, wherein the proximity sensor outputs a signal indicative of a relative position of the coupler sleeve and the coupler body.

* * * * *